United States Patent
Yu et al.

(10) Patent No.: US 12,476,767 B2
(45) Date of Patent: Nov. 18, 2025

(54) INFORMATION SENDING METHOD AND APPARATUS, AND INFORMATION RECEIVING METHOD AND APPARATUS

(71) Applicant: HUAWEI TECHNOLOGIES CO., LTD., Guangdong (CN)

(72) Inventors: Jian Yu, Beijing (CN); Yawei Yu, Shenzhen (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 659 days.

(21) Appl. No.: 17/886,679

(22) Filed: Aug. 12, 2022

(65) Prior Publication Data

US 2022/0416856 A1 Dec. 29, 2022

Related U.S. Application Data

(63) Continuation of application No. PCT/CN2020/075230, filed on Feb. 14, 2020.

(51) Int. Cl.
*H04W 4/00* (2018.01)
*H04B 7/0456* (2017.01)
(Continued)

(52) U.S. Cl.
CPC ......... *H04L 5/0094* (2013.01); *H04B 7/0456* (2013.01); *H04B 7/0639* (2013.01); *H04L 5/0051* (2013.01)

(58) Field of Classification Search
CPC ... H04L 5/0094; H04L 5/0051; H04L 5/0044; H04B 7/0456; H04B 7/0639; H04B 7/0404; H04B 7/0695
See application file for complete search history.

(56) References Cited

U.S. PATENT DOCUMENTS

2006/0039489 A1* 2/2006 Ikram ............... H04L 25/03343
375/299
2010/0189079 A1* 7/2010 Eichinger ............ H04B 7/0669
370/335
(Continued)

FOREIGN PATENT DOCUMENTS

CN 102394678 A 3/2012
CN 109150269 A 1/2019
(Continued)

OTHER PUBLICATIONS

Partial Supplementary European Search Report dated Jan. 5, 2023 issued for European Application No. 20919262.4 (12 pages).
(Continued)

*Primary Examiner* — Sithu Ko
*Assistant Examiner* — Hidayat Dabiri

(57) ABSTRACT

An information receiving method and apparatus, and an information sending method and apparatus are disclosed. The information receiving method includes: A terminal device receives first configuration information from a network device, where the first configuration information carries precoding indication information of each resource unit of N resource units allocated to the terminal device; and the terminal device performs precoding processing on uplink data carried on each resource unit by a precoding matrix corresponding to the precoding indication information of each resource unit, based on the first configuration information. In this method, the terminal device determines, based on the precoding indication information, a quantity N and sizes of the resource units obtained through division.

14 Claims, 9 Drawing Sheets

(51) Int. Cl.
H04B 7/06 (2006.01)
H04L 5/00 (2006.01)

(56) References Cited

U.S. PATENT DOCUMENTS

| | | | | |
|---|---|---|---|---|
| 2022/0141803 A1* | 5/2022 | Guo | ............... | H04B 7/0404 370/329 |
| 2022/0287059 A1* | 9/2022 | Huang | ............ | H04W 52/146 |

FOREIGN PATENT DOCUMENTS

| | | | | |
|---|---|---|---|---|
| CN | 109150471 A | | 1/2019 | |
| CN | 110383738 A | | 10/2019 | |
| EP | 3598658 A1 | | 1/2020 | |
| EP | 3629648 A1 | | 4/2020 | |
| EP | 3709720 A1 | | 9/2020 | |
| KR | 20080103161 A | * | 11/2008 | ........... H04B 7/0417 |
| WO | WO-2017162066 A1 | * | 9/2017 | ........... H04B 7/0478 |
| WO | 2018174641 A2 | | 9/2018 | |
| WO | WO-2018228235 A1 | * | 12/2018 | ........... H04B 7/0456 |
| WO | 2019100296 A1 | | 5/2019 | |

OTHER PUBLICATIONS

Huawei, HiSilicon, On the performance of the Multi-Subband UL MIMO and Channel Rank Properties. 3GPP TSG RAN WG1 Meeting AH NR#3, Nagoya, Japan, Sep. 18-21, 2017, R1-1715718, 4 pages.
3GPP TS 38.214 V16.0.0 (Dec. 2019), 3rd Generation Partnership Project; Technical Specification Group Radio Access Network; NR; Physical layer procedures for data (Release 16), 147 pages.
3GPP TS 38.211 V16.0.0 (Dec. 2019), 3rd Generation Partnership Project; Technical Specification Group Radio Access Network; NR; Physical channels and modulation(Release 16), 129 pages.
3GPP TS 38.212 V16.0.0 (Dec. 2019), 3rd Generation Partnership Project; Technical Specification Group Radio Access Network; NR; Multiplexing and channel coding(Release 16), 145 pages.
International Search Report and Written Opinion issued in PCT/CN2020/075230, dated Nov. 6, 2020, 10 pages.

* cited by examiner

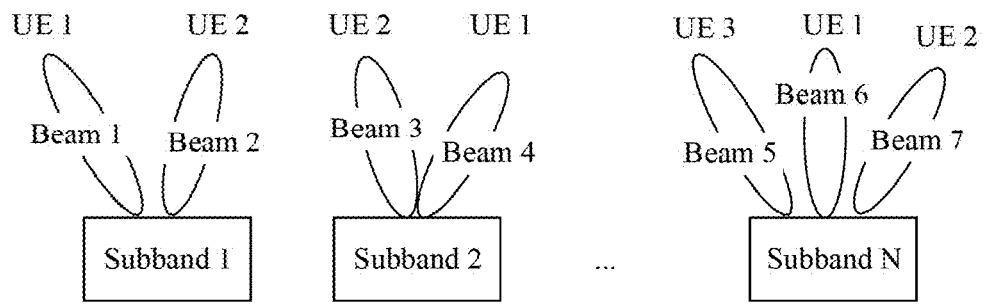

FIG. 3

```
┌─────────────────────────────────────────────────────────────┐
│ A network device sends first configuration information to a │  101
│ terminal device, where the first configuration information  │ ┌─
│ carries precoding indication information of each resource   │ ┘
│ unit of N resource units allocated to the terminal device,  │
│ N≥1, and N is a positive integer                            │
└─────────────────────────────────────────────────────────────┘
                              │
┌─────────────────────────────────────────────────────────────┐
│ The terminal device performs precoding processing on uplink │  102
│ data carried on each resource unit by a precoding matrix    │ ┌─
│ corresponding to the precoding indication information of    │ ┘
│ each resource unit, based on the first configuration        │
│ information                                                  │
└─────────────────────────────────────────────────────────────┘
```

FIG. 4

Two antenna ports, enabling, a maximum value of 1 of a transmission rank, and transmitted precoding information

| Bitmap index | Codebook set: fullyAndPartialAndNonCoherent |
|---|---|
| 0 | 1 layer: TPMI=0 |
| 1 | 1 layer: TPMI=1 |
| 2 | 1 layer: TPMI=2 |
| 3 | 1 layer: TPMI=3 |
| 4 | 1 layer: TPMI=4 |
| 5 | 1 layer: TPMI=5 |
| 6-7 | reserved |

Codebook set restriction →

| Bitmap index | Codebook set: fullyAndPartialAndNonCoherent |
|---|---|
| 0 | ~~1 layer: TPMI=0~~ |
| 1 | ~~1 layer: TPMI=1~~ |
| 2→0 | 1 layer: TPMI=2 |
| 3→1 | 1 layer: TPMI=3 |
| 4 | ~~1 layer: TPMI=4~~ |
| 5 | ~~1 layer: TPMI=5~~ |
| 6-7 | ~~reserved~~ |

Restricted codebook set →

| Bitmap index | Codebook set: fullyAndPartialAndNonCoherent |
|---|---|
| 0 | 1 layer: TPMI=2 |
| 1 | 1 layer: TPMI=3 |

FIG. 11

INFORMATION SENDING METHOD AND APPARATUS, AND INFORMATION RECEIVING METHOD AND APPARATUS

CROSS-REFERENCE TO RELATED APPLICATIONS

This application is a continuation of International Application No. PCT/CN2020/075230, filed on Feb. 14, 2020, the disclosure of which is hereby incorporated by reference in its entirety.

TECHNICAL FIELD

This disclosure relates to the communication field, and in particular, to an information sending method and apparatus, and an information receiving method and apparatus.

BACKGROUND

In a wireless communication system, communication in which a network device sends a message to a terminal device is usually referred to as downlink (DL) communication. On the contrary, communication in which the terminal device sends information to the network device is referred to as uplink (UL) communication. In fourth generation (4G) and fifth generation (5G) wireless communication systems, a reference signal such as a demodulation reference signal (DMRS) or a sounding reference signal (SRS) that may be used to estimate channel quality on a network side is defined. The DMRS is used for data demodulation on a physical uplink shared channel (PUSCH). The SRS is used to measure channel state information (CSI), where the CSI includes a channel quality indicator (CQI), a precoding matrix indicator (PMI), a rank indicator (RI), an SRS resource indicator (SRI), and the like.

In the 5G wireless communication system, also referred to as a new radio (NR) access system, two types of waveforms can be used for uplink PUSCH transmission. One is a cyclic prefixed orthogonal frequency division multiplexing (CP-OFDM) waveform, and the other is a discrete Fourier transform spread orthogonal frequency division multiplexing OFDM (DFT-S-OFDM) waveform. A specific waveform to be selected may be configured by using higher layer signaling. During PUSCH transmission, two resource allocation types are included. One is a resource allocation type based on a resource block group (RBG), and the other is a resource allocation type based on a single resource block (RB). Each RB includes 12 resource elements (REs) or 12 subcarriers in frequency domain.

In uplink transmission, when a plurality of antennas are configured for both the terminal device and a base station, the base station needs to send the PMI or the SRI to the terminal device by using a downlink control indicator (DCI), so that when sending the PUSCH, the terminal device maps data to a plurality of antenna ports through precoding. Because an amplitude and a phase of the channel change with time, to better match a time-frequency change characteristic of the channel, a precoding matrix needs to be dynamically adjusted to adapt to the change of the channel. In a current NR standard, a system supports a codebook-based transmission mode and a non-codebook-based transmission mode in the uplink transmission. In the codebook-based transmission mode, the base station indicates a transmitted PMI (TPMI) to the terminal device. In the non-codebook-based transmission mode, the base station indicates the SRI to the terminal device. For uplink multi-antenna transmission, precoding is applied to both data transmitted on the DMRS and data transmitted on the PUSCH. Therefore, a precoding design affects channel estimation of the DMRS and reliability of the PUSCH transmission.

Currently, only wideband precoding is considered during precoding designing. To be specific, a same precoding matrix is used on scheduled RBs allocated to the terminal device. The precoding matrix is fairly applicable to a flat and unchanged frequency-domain channel. However, when the frequency-domain channel ripples and changes, a wideband precoding matrix cannot match the change of the channel. Consequently, uplink PUSCH transmission performance is reduced. In addition, during MU pairing, because different users may be paired on different time-frequency resource blocks, and channel conditions are different, if the wideband precoding is used, the plurality of users interfere with each other. Therefore, more refined precoding is required to improve PUSCH transmission performance and reduce interference, to improve uplink edge coverage and uplink capacity.

SUMMARY

Embodiments of this disclosure provide an information sending method and apparatus, and an information receiving method and apparatus, to improve PUSCH transmission performance. Specifically, this disclosure provides the following technical solutions.

According to a first aspect, an embodiment of this disclosure provides an information receiving method, where the method may be applied to a terminal device, and the method includes: The terminal device receives first configuration information from a network device, where the first configuration information carries precoding indication information of each resource unit of N resource units allocated to the terminal device, N≥1, and N is a positive integer; and the terminal device performs precoding processing on uplink data carried on each resource unit by a precoding matrix corresponding to the precoding indication information of each resource unit, based on the first configuration information.

The precoding indication information includes a transmitted precoding matrix indicator TPMI or a sounding reference signal resource indicator SRI. Specifically, in a codebook-based transmission mode, the precoding indication information is a TPMI or a TPMI index; and in a non-codebook-based transmission mode, the precoding indication information is an SRI.

Optionally, in a possible implementation, the first configuration information includes a first field, and the first field indicates the terminal device to perform the precoding processing based on the first configuration information when transmitting the uplink data. Further, the first field indicates to enable field precoding. For example, the first field is a field, namely, "subbandPrecoding".

A total resource obtained by division may be an entire bandwidth part BWP between the network device and the terminal device, or a part of the BWP. Alternatively, the total resource may be bandwidth used for scheduling. Scheduled bandwidth is a frequency domain resource actually allocated to the terminal device when the network device schedules the terminal device at a moment, and bandwidth of the frequency domain resource is less than or equal to the BWP.

In the method provided in this aspect, the terminal device receives the precoding indication information from the network device, and determines, based on the precoding indication information, a quantity and sizes of the resource units obtained through division. Because granularities of the resource units obtained through division in frequency domain are smaller, when the terminal device determines the uplink data based on precoding corresponding to each resource unit, and sends a PUSCH, channel changes in different frequency domains can be matched, and reception of the PUSCH is enhanced, thereby improving an uplink edge user throughput and an average uplink cell throughput.

In addition, in a multi-user pairing and coordination scenario, inter-cell interference can be reduced in the method.

Optionally, the resource unit may be a subband, or may be a smaller unit such as a subcarrier.

Further, with reference to the first aspect, in a possible implementation of the first aspect, that the terminal device performs precoding processing on uplink data carried on each resource unit includes: The terminal device performs, by using the precoding matrix corresponding to each TPMI or SRI, data mapping, and determines the uplink data to be transmitted through each antenna port of the terminal device.

A quantity of TPMIs or SRIs included in the first configuration information is N, and is the same as a quantity of resource units obtained through division. Each TPMI or SRI indicates a precoding matrix required by one resource unit.

With reference to the first aspect, in another possible implementation of the first aspect, before the performing precoding processing on uplink data carried on each resource unit, the method further includes: The terminal device determines, based on the precoding indication information of each resource unit and a correspondence between the precoding indication information and a first codebook set, the precoding matrix corresponding to each resource unit, where the first codebook set includes at least one precoding matrix.

The correspondence is a correspondence between the TPMI or the TPMI index and the first codebook set, or the correspondence is a correspondence between the SRI and the first codebook set.

With reference to the first aspect, in still another possible implementation of the first aspect, the method further includes: The terminal device receives first signaling from the network device; and determines a second codebook set based on the first signaling, where the second codebook set is a subset of the first codebook set. In addition, the method further includes: The terminal device determines from the second codebook set, based on each piece of precoding indication information, the precoding matrix corresponding to each resource unit.

Further, the first signaling includes a codebook set restriction field, and the field indicates UE to select a to-be-used codebook in a codebook subset restriction range. Optionally, the codebook set restriction field is a field, namely, "codebookSubsetRestrict". The first signaling is RRC signaling, MAC signaling, or DCI signaling.

With reference to the first aspect, in still another possible implementation of the first aspect, before that the terminal device receives first configuration information from a network device, the method further includes: The terminal device receives second configuration information from the network device, where the second configuration information carries a quantity N of resource units allocated to the terminal device or a size of each resource unit, and indication information indicating a frequency domain starting position of each resource unit.

Specifically, the terminal device may determine the quantity N of the resource units obtained through division and the size of each resource unit based on the following cases:

In a first case, the second configuration information includes the quantity N of the resource units.

In a second case, the second configuration information includes the size of each resource unit.

In a third case, the second configuration information includes the size of each resource unit and the indication information of the frequency domain starting position of each resource unit.

In a fourth case, the second configuration information includes the quantity N of the resource units and the size of each resource unit.

In the third case, the indication information of the frequency domain starting position of each resource unit may indicate at least one of a starting position of each resource unit, an ending position of each resource unit, or a length of each resource unit.

For example, in an implementation, the network device indicates a starting position and an ending position of a scheduled resource unit to the terminal device, so that the terminal device can know a size of a scheduled resource. For example, the size of the scheduled resource is expressed in a quantity of RBGs, and the scheduled resource may be several consecutive or non-consecutive RBGs. Then, the terminal device determines the quantity N of the resource units based on the size of each resource unit in the second configuration information, or determines the size of each resource unit based on the quantity N of the resource units in the second configuration information.

With reference to the first aspect, in still another possible implementation of the first aspect, the method further includes: The terminal device receives a CSI-RS from the network device, measures downlink channel quality based on the CSI-RS, determines, based on the downlink channel quality, the precoding matrix corresponding to each resource unit, and weights data of each resource unit based on the precoding matrix, to obtain a weighted precoded SRS; and the terminal device finally sends the weighted precoded SRS to the network device.

This implementation is applied to the non-codebook-based transmission mode. The terminal device obtains the downlink channel quality based on the CSI-RS from the network device, and then obtains uplink channel quality based on channel reciprocity, to prepare for determining the precoding of each resource unit.

With reference to the first aspect, in still another possible implementation of the first aspect, the method further includes: The terminal device sends an SRS to the network device, where the SRS is used to perform CSI measurement for the network device, to obtain channel quality information.

According to a second aspect, an embodiment of this disclosure further provides an information sending method, where the method is applied to a terminal device, and the method includes: A network device sends first configuration information to the terminal device, where the first configuration information carries precoding indication information of each resource unit of N resource units allocated to the terminal device, N≥1, and N is a positive integer.

The precoding indication information includes a TPMI or an SRI.

Optionally, in a possible implementation, the first configuration information includes a first field, and the first field indicates the terminal device to perform precoding processing based on the first configuration information when transmitting the uplink data. Further, the first field is a field, namely, "subbandPrecoding", and indicates to enable subband precoding.

With reference to the second aspect, in a possible implementation of the second aspect, the method further includes: The network device determines a precoding matrix of each resource unit, and determines the precoding indication information corresponding to the precoding matrix of each resource unit, where each piece of precoding indication information indicates a precoding matrix of one corresponding resource unit.

One precoding matrix corresponds to one of the N resource units, and each precoding matrix may be indicated by using the TPMI index or the SRI.

With reference to the second aspect, in another possible implementation of the second aspect, that the network device determines a precoding matrix of each resource unit includes: The network device obtains a channel matrix of the terminal device on each resource unit based on a reference signal through channel estimation; and traverses at least one precoding matrix in a first codebook set based on the channel matrix on each resource unit, and determines the precoding matrix of each resource unit from the at least one precoding matrix based on a capacity maximization criterion.

The reference signal is an SRS. The SRS is sent by the terminal device to the network device.

With reference to the second aspect, in still another possible implementation of the second aspect, the method further includes: The network device sends first signaling to the terminal device, where the first signaling indicates a second codebook set corresponding to the precoding matrix, and the second codebook set is a subset of the first codebook set.

Optionally, the first signaling includes a codebook set restriction field, namely, "codebookSubsetRestrict", indicating to determine the second codebook set.

In this implementation, a codebook index is restricted, so that when the TPMI is indicated to the terminal device, only some restricted codebook sets are indicated. Therefore, compared with a case in which all codebook sets are indicated when no restriction is performed, this method reduces indication signaling overheads.

With reference to the second aspect, in still another possible implementation of the second aspect, that the network device determines a precoding matrix of each resource unit includes: The network device receives a precoded SRS from the terminal device; and then performs channel state information CSI measurement based on the precoded SRS, to obtain the precoding matrix of each resource unit.

In addition, after completing the CSI measurement, the network device may further obtain information such as a channel quality indicator CQI and a rank indicator RI.

With reference to the second aspect, in still another possible implementation of the second aspect, before that a network device sends first configuration information to the terminal device, the method further includes: The network device sends second configuration information to the terminal device, where the second configuration information carries a quantity N of the resource units allocated to the terminal device or a size of each resource unit, where the second configuration information further carries indication information indicating a frequency domain starting position of each resource unit.

The quantity N of the resource units or the size of each resource unit may be indicated by using a second field. For example, the second field is a field, namely, "rbg-Size", or a field, namely, "subbandNumberForPrecoding".

Optionally, the second configuration information may further include the foregoing first field, that is, an indication field indicating to enable subband precoding.

In addition, the second configuration information may be sent by using RRC signaling, MAC signaling, or DCI signaling.

In the method provided in this aspect, uplink PUSCH transmission is based on the subband precoding. In addition, a quantity of subbands and a size of each subband are further configured, so that flexible precision division and control are implemented, thereby facilitating adaptation to different coherence bandwidth sizes. In addition, a quantity and sizes of subbands used only for scheduling in one transmission are indicated, thereby further reducing signaling overheads.

According to a third aspect, an embodiment of this disclosure further provides an information receiving apparatus. The apparatus is configured to implement the method in the first aspect and the implementations of the first aspect.

The apparatus is a terminal device, for example, UE.

Optionally, the apparatus includes at least one functional unit or module. Further, the at least one functional unit is a receiving unit, a processing unit, a sending unit, or the like.

According to a fourth aspect, an embodiment of this disclosure further provides an information sending apparatus. The apparatus is configured to implement the method in the second aspect and the implementations of the second aspect.

The apparatus is a network device, for example, a base station or a server.

According to a fifth aspect, an embodiment of this disclosure further provides a communication apparatus, including a processor and a memory, where the processor is coupled to the memory.

The memory is configured to store instructions.

The processor is configured to invoke the instructions to enable the communication apparatus to perform the method in the first aspect and the implementations of the first aspect, or the processor is configured to invoke the instructions to enable the communication apparatus to perform the method in the second aspect and the implementations of the second aspect.

In a possible implementation, the communication apparatus further includes a transceiver, and the transceiver is configured to receive or send information, data, and the like of a peer device.

Further, the communication apparatus is the apparatus in the third aspect or the fourth aspect. When used as the apparatus in the third aspect, the communication apparatus may be a terminal device, for example, UE. When used as the apparatus in the fourth aspect, the communication apparatus may be a network device, for example, a base station eNB.

According to a sixth aspect, an embodiment of this disclosure further provides a computer-readable storage medium. The storage medium stores instructions. When the instructions are run on a computer or a processor, the instructions are used to perform the method in the first aspect and the implementations of the first aspect, or used to perform the method in the second aspect and the implementations of the second aspect.

According to a seventh aspect, an embodiment of this disclosure further provides a computer program product. The computer program product includes computer instructions. When the instructions are executed by a computer or a processor, the method in the first aspect and the implementations of the first aspect or the method in the second aspect and the implementations of the second aspect can be implemented.

According to an eighth aspect, an embodiment of this disclosure further provides a chip system. The chip system includes a processor and an interface circuit, the interface circuit is coupled to the processor, and the processor is configured to execute a computer program or instructions, to implement the method in the first aspect and the implementations of the first aspect, or implement the method in the second aspect and the implementations of the second aspect.

The interface circuit is configured to communicate with another module other than the chip system.

According to a ninth aspect, an embodiment of this disclosure further provides a communication system, including at least two communication apparatuses. The at least two communication apparatuses include one network device and at least one terminal device. The terminal device may be the apparatus in the third aspect, and is configured to implement the information receiving method in the first aspect and the implementations of the first aspect. The network device may be the apparatus in the fourth aspect, and is configured to implement the information sending method in the second aspect and the implementations of the second aspect.

In the method provided in this disclosure, the network device uses indication information of the subband precoding, so that when sending a PUSCH and a DMRS, the terminal device can use different precoding matrices or vectors on different subbands, to match rippling and changes of a frequency-domain channel. In addition, the method is applicable to both codebook-based transmission and non-codebook-based transmission, and is widely and flexibly applied.

BRIEF DESCRIPTION OF DRAWINGS

FIG. 3 is a schematic diagram of a beam direction of subband-based multi-user pairing according to an embodiment of this disclosure;

FIG. 4 is a flowchart of an information sending method according to an embodiment of this disclosure;

FIG. 11 is a schematic diagram of a restricted codebook set according to an embodiment of this disclosure;

DESCRIPTION OF EMBODIMENTS

To make a person skilled in the art understand technical solutions in embodiments of this disclosure better, and make objectives, features, and advantages of embodiments of this disclosure clearer and more comprehensible, application scenarios of embodiments of this disclosure are first described in detail with reference to accompanying drawings.

The technical solutions of this disclosure may be applied to a network system including a base station and a terminal device, for example, a long term evolution (LTE) system or a 5th generation (5G) mobile communication system, or may be further applied to a future network system, for example, a 6th or 7th generation mobile communication system, provided that one entity in the communication system needs to send downlink data and pilot information, the other entity needs to receive indication information, and can feed back information and transmit data through an uplink. A 5th generation wireless communication system is also referred to as a new radio (NR) access technology system.

Figure 1:
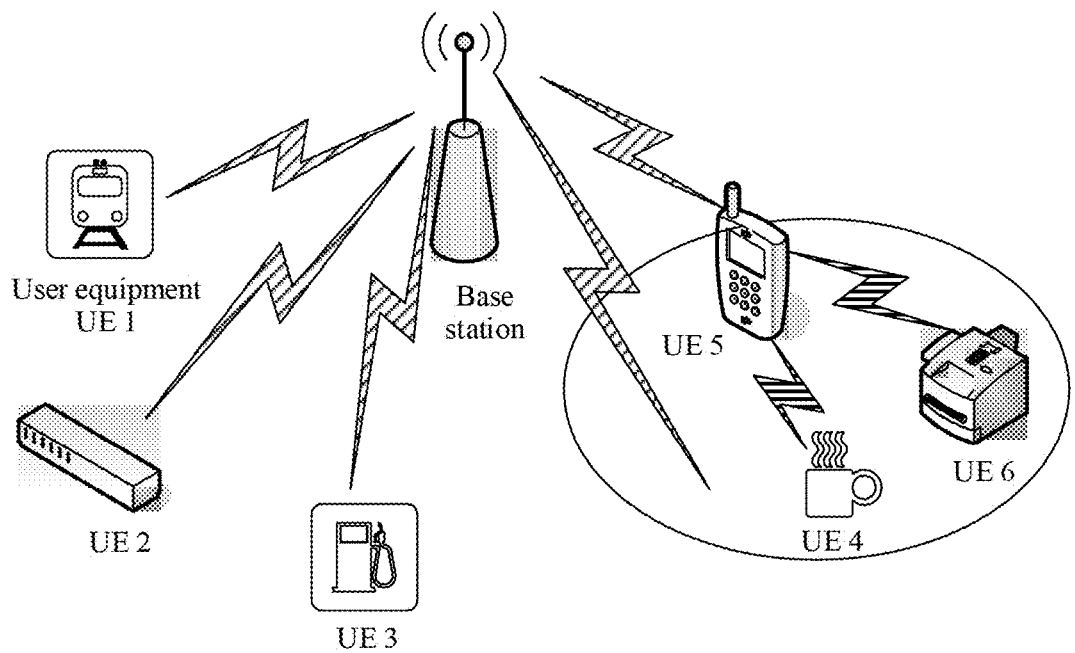
FIG. 1 is a schematic diagram of a scenario of a base station and a terminal device according to an embodiment of this disclosure.

As shown in FIG. 1, a wireless communication system includes a network device and at least one terminal device. The network device is configured to receive an uplink signal from the terminal device, or send a downlink signal to the terminal device. Further, the network device may be a base station (BS). For example, the base station may be a base station (BTS) in a global system for mobile communications (GSM) or code division multiple access (CDMA), a base station (NodeB) in wideband code division multiple access (WCDMA), an evolved NodeB (eNB/e-NodeB) in LTE, an evolved NodeB (ng-eNB) in next generation LTE, a base station (gNB) in NR, a base station in a future mobile communication system, or an access node in a wireless fidelity (Wi-Fi) system. A specific technology and a specific device form that are used for the network device are not limited in embodiments of this disclosure. In this disclosure, the network device may be a radio access network device, a radio access point, or the like.

The terminal device in embodiments of this disclosure is configured to send an uplink signal to the network device, or receive a downlink signal from the network device. Specifically, the terminal device refers to a device that provides a user with service and/or data connectivity, a handheld device with a wireless connection function, or another processing device connected to a wireless modem, for example, a wireless terminal.

Further, the wireless terminal may communicate with one or more nodes through a radio access network (RAN). The wireless terminal may be a mobile terminal such as a mobile phone (also referred to as a "cellular" phone) and a computer with a mobile terminal, for example, may be a portable, pocket-sized, handheld, computer built-in, or vehicle-mounted mobile apparatus, which exchanges a language and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may alternatively be a subscriber unit, a subscriber station, a mobile station, a mobile (station, a remote station, an access point, a remote terminal, an access terminal, a user terminal, a user agent, a user device, user equipment (UE), or the like. A specific technology and a specific device form that are used for the terminal device are not limited in embodiments of this disclosure.

In embodiments, as shown in FIG. 1, only six types of UE are used as examples, which are respectively UE 1, that is, a train detector, UE 2, that is, a router, UE 3, that is, a gas station, UE 4, that is, a coffee machine, UE 5, that is, a mobile phone, and UE 6, that is, a printer. The base station and the UE 1 to the UE 6 form a wireless communication system. In the communication system, the UE 1 to the UE 6 may receive control information and downlink data from the base station, and send uplink data to the base station; and the base station needs to receive the uplink data from the UE 1 to the UE 6. In addition, the UE 4 to the UE 6 may alternatively form a communication system. In the communication system, the base station may send downlink information to the UE 1, the UE 2, the UE 3, the UE 5, and the like; and the UE 5 may also send downlink information to the UE 4 and the UE 6.

Then, concepts in embodiments of this disclosure are explained and described.

Bandwidth Part (BWP)

A concept of the BWP is introduced in NR, to be specific, transmission between a network device and UE is supported by occupying a part of bandwidth. 5G system bandwidth (which is bandwidth of a carrier and corresponds to bandwidth of each component carrier (CC) in a carrier aggregation (CA) or dual connectivity (DC) scenario) may be 200 MHz or 400 MHz. Some terminals do not support such large bandwidth. Therefore, the network device may configure a BWP (a part of the system bandwidth) for the UE, for example, 100 MHz. The UE may communicate with the network device on the 100 MHz.

The BWP may be classified into a downlink BWP (DL BWP) and an uplink BWP (UL BWP). The network device may configure a plurality of DL BWPs and/or a plurality of UL BWPs for the terminal, and activate at least one DL BWP and at least one UL BWP. The UE receives, on the activated DL BWP, a downlink signal from the network device. The downlink signal includes but is not limited to downlink control signaling, downlink data, and the like. The terminal sends an uplink signal on the activated UL BWP. The uplink signal includes but is not limited to uplink control signaling, uplink data, an uplink scheduling request (SR), an uplink sounding reference signal (SRS), channel state information (CSI), channel quality indicator (CQI) feedback, and the like.

The following describes a codebook-based transmission mode in embodiments of this disclosure.

The codebook-based transmission mode refers to selecting a precoding matrix from a pre-provided codebook set. In a propagation process in a free space, an electromagnetic wave transmitted by a terminal device is reflected by an obstacle, and arrives at a base station through a plurality of different paths, that is, a multipath effect of a channel is formed. Due to different multipath delays and power, the channel ripples and changes in frequency domain, and a frequency-selective characteristic of the channel is formed.

In multiple-input multiple-output (MIMO) transmission, spatial diversity and spatial multiplexing can be implemented through precoding at a transmit end. The spatial diversity helps improve signal transmission reliability, and the spatial multiplexing helps transmit a plurality of parallel data streams at the same time. For both spatial diversity and spatial multiplexing, proper precoding needs to be selected to match the channel A method for selecting the precoding is as follows: The terminal device performs eigenvalue decomposition on a MIMO channel matrix, and then selects an eigenvector as the precoding.

In NR, for low-frequency transmission (where for example, a carrier frequency is less than 6 GHz), bandwidth of a carrier may be 100 MHz, and may include up to 273 resource blocks (RBs). In an environment with rich multipath scattering, the channel changes significantly in the frequency domain. Generally, the channel has a strong correlation in coherence bandwidth. Further, the coherence bandwidth is an important parameter for representing a characteristic of a multipath channel, and refers to a specific frequency range. Any two frequency components in the specific frequency range have a strong amplitude correlation. That is, within a coherence bandwidth range, the multipath channel has a constant gain and a linear phase, and the coherence bandwidth is approximately equal to a reciprocal of a maximum multipath delay. Therefore, in the technical solutions provided in this disclosure, system bandwidth is divided into a plurality of subbands to determine the precoding.

Figure 2:
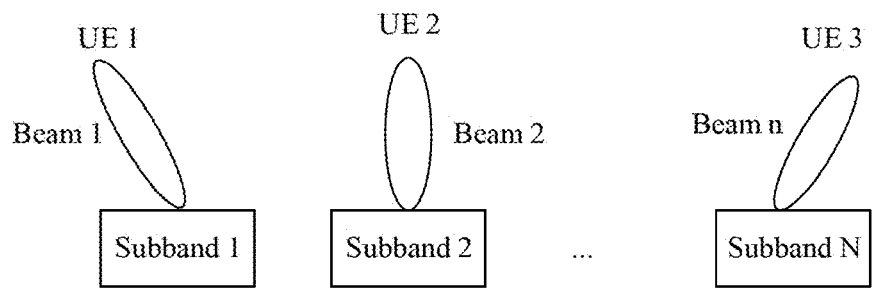
FIG. 2 is a schematic diagram of a beam direction of subband-based user pairing according to an embodiment of this disclosure.

As shown in FIG. 2, an entire frequency domain resource is divided into N subbands, the subbands are numbered from 1 to N, and different precoding matrices may be selected for each subband, to match an optimal transmit beam direction. For example, a beam 1 has a pairing relationship with UE 1, and a beam 2 has a pairing relationship with UE 2.

When a plurality of users are paired with different beams, because different users may be matched on different subbands, an optimal precoding matrix may be selected for each subband based on different paired users and a channel condition. As shown in FIG. 3, seven beams (a beam 1 to a beam 7) need to be paired by using seven precoding matrices. The beam 1 and the beam 2 in a subband 1 are separately paired with UE 1 and UE 2, the beam 3 and the beam 4 in a subband 2 are separately paired with the UE 2 and the UE 1, and the beam 5 to the beam 7 in a subband 3 are separately paired with the UE 1, the UE 2, and UE 3. Because paired users of the UE 1 on each subband are different, interference generated between the UE is also different. If data is still transmitted by using wideband precoding, the wideband precoding may fail to match a frequency-selective characteristic of a channel, interference between the users is strong, and the users cannot be paired.

The technical solutions of this disclosure provide an information sending method, to help resolve a technical problem that the wideband precoding cannot match the frequency-selective characteristic of the channel, and also help resolve technical problems of strong interference during multi-user pairing and strong inter-cell interference. In this way, reception efficiency of a physical uplink shared channel (PUSCH) is improved, and uplink coverage and an edge capacity are improved.

The following describes in detail the technical solutions in embodiments of this disclosure with reference to the accompanying drawings.

The technical solutions in embodiments are applied to the foregoing wireless communication system including the network device and the terminal device. The network device serves as a transmit end, and provides an information sending method. Correspondingly, the terminal device serves as a receive end, and provides an information receiving method.

FIG. 4 is a flowchart including the information sending method and the information receiving method. The methods include the following steps.

101. A network device sends first configuration information to a terminal device, where the first configuration information carries precoding indication information of each resource unit of N resource units allocated to the terminal device, N≥1, and N is a positive integer.

The precoding indication information includes a transmitted PMI (TPMI) or an SRS resource indicator (SRI). Further, in a codebook-based transmission mode, the precoding indication information includes the TPMI; and in a non-codebook-based transmission mode, the precoding indication information includes the SRI.

A resource allocated by the network device to the terminal device may be a bandwidth part (BWP), or may be a total resource for transmission between the network device and the terminal device. For the BWP, the resource unit may be a subband. In other words, the BWP is divided into N subbands, where N≥1, and N is a positive integer. For example, if N=4, the BWP is divided into four subbands.

Correspondingly, the terminal device receives the first configuration information from the network device.

Optionally, the first configuration information may be sent by using a downlink control indicator (DCI). Alternatively, the first configuration information may be sent to the terminal device by using media access control (MAC) signaling, radio resource control (RRC) signaling, or the like.

102. The terminal device performs precoding processing on uplink data carried on each resource unit by a precoding matrix corresponding to the precoding indication information of each resource unit, based on the first configuration information.

Specifically, the terminal device determines the uplink data based on different precoding indication information carried in the first configuration information, and completes transmission of the uplink data.

Further, in a specific implementation, the network device sends, to the terminal device by using the DCI, a TPMI corresponding to each resource unit; and the terminal device determines, based on each TPMI, the precoding matrix corresponding to each resource unit, and sends a PUSCH to the network device based on the precoding matrix. Specifically, the terminal device performs data mapping by using the precoding matrix of each resource unit, and generates data to be sent through each antenna port, to complete PUSCH sending.

In another specific implementation, the network device sends, to the terminal device by using the DCI, an SRI corresponding to each resource unit; and the terminal device determines the precoding matrix of each resource unit based on each SRI, performs mapping on to-be-transmitted data by using the precoding matrix of each resource unit, and generates the data to be sent through each antenna port, to complete PUSCH sending.

In addition, the terminal device further sends a DMRS in a PUSCH sending process, and a DMRS in a same resource unit as the data also needs to use a same precoding matrix as the data, so that the network device performs channel estimation and data demodulation.

In the method provided in this embodiment, the network device sends the precoding indication information of the resource units obtained through division to the terminal device. Because granularities of the resource units obtained through division in frequency domain are smaller, when the terminal device determines the uplink data based on precoding corresponding to each resource unit, and sends the PUSCH, channel changes in different frequency domains can be matched, and reception performance of the PUSCH is enhanced, thereby improving an uplink edge user throughput and an average uplink cell throughput.

In addition, in a multi-user pairing and coordination scenario, inter-cell interference can be reduced in the method.

The following describes in detail a process in which the network device determines and sends the precoding indication information of each resource unit in step 101.

In an embodiment, the first configuration information includes a first field, and the first field indicates the terminal device to perform precoding processing based on the first configuration information when transmitting uplink data. Specifically, when uplink transmission of the terminal device uses subband precoding, the first field indicates to enable the subband precoding, that is, indicate the terminal device to transmit the uplink data in a subband precoding manner.

Alternatively, the first field indicates whether the terminal device uses the first configuration information to perform precoding and transmission. In a possible implementation, the first field indicates whether the terminal device enables the subband precoding. If yes, the terminal device transmits the uplink data in the subband precoding manner. Further, if the first field is "1", it indicates to enable the subband precoding, that is, it indicates the terminal device to use a subband precoding matrix when performing uplink transmission through the PUSCH. If the first field is "0", it indicates the terminal device not to enable the subband precoding, that is, not to use a subband precoding matrix. The terminal device may continue to use a wideband precoding matrix.

Whether the network device configures the first field to indicate to enable the subband precoding may be determined based on performance of the subband precoding. The performance of the subband precoding includes a total throughput that is of each subband and that is calculated during the subband precoding. If the performance of the subband precoding is higher than performance of wideband precoding, the first field is configured, to indicate the terminal device to transmit the uplink data by using the subband precoding matrix.

Optionally, the first field is a field, namely, "subbandPrecoding".

In an embodiment, before that a network device sends first configuration information, the method further includes: The network device sends second configuration information to the terminal device, where the second configuration information carries a quantity N of the resource units allocated to the terminal device or a size of each resource unit.

It is assumed that a total transmission resource allocated by the network device to the terminal device is a first resource, and the first resource is an entire BWP or a part of the BWP. When it indicates to enable the subband precoding, the first resource needs to be divided into N resource units, and sizes of the N resource units may be the same or may be different. In this embodiment, an example in which the resource unit is a subband and N subbands obtained through division have a same size is used for description. The size of each subband may be expressed in a quantity of RBs, or may be expressed in a quantity of RBGs.

When the first configuration information carries the first field, or the first field is "1", that is, it indicates to enable the subband precoding, a quantity of subbands carried in the second configuration information is N, or the size of each subband may be indicated in the following manners.

Manner 1

The second configuration information includes a second field, where the second field indicates the size of each subband, and the sizes of all the subbands are the same. For example, the size of the subband obtained through division is expressed in a quantity of RBGs, and each RBG includes several RBs. For example, one RBG may include two, four, eight, or more RBs.

Further, if the size of each subband is expressed in a quantity of RBGs, the size of the resource unit is indicated by using a field, namely, "resourceAllocation", in a higher layer parameter, namely, ConfiguredGrantConfig. An RBG size needs to be indicated by using a field, namely, "rbg-Size", in the higher layer parameter, namely, ConfiguredGrantConfig. The RBG size is related to a size of the bandwidth part BWP. Details are shown in Table 1 below. The first column represents a BWP size, the BWP size is expressed in a quantity of RBs included in the BWP, and the second column and the third column represent quantities of RBs included in each RBG.

TABLE 1

Correspondence between an RBG size and a BWP

| BWP Size (BWP Size) | Configuration 1 (Config 1) | Configuration 2 (Config 2) |
|---|---|---|
| 1 to 36 | 2 | 4 |
| 37 to 72 | 4 | 8 |
| 73 to 144 | 8 | 16 |
| 145 to 276 | 16 | 16 |

Optionally, the second field is a field, namely, "rbg-Size".

The correspondence shown in "Table 1" is prestored in a base station and the terminal device. In addition, the BWP size is known by both the base station and the terminal device in a transmission process. Therefore, only the first field and the second field are used for joint indication, that is, "enabling indication" and the "RBG size" are used for joint indication.

For example, content of the second field, namely, "rbg-Size", included in the second configuration information from the base station is "Config 2", that is, each RBG includes four RBs. If content of the first field, namely, "subbandPrecoding", included in the first configuration information from the base station is "1", when the BWP size is 36 RBs, the base station determines that the quantity N of the subbands is 9, and each subband includes four RBs. For another example, if content of the first field is "1", content of the second field is "Config 2", a third field indicating the BWP size is further included, and content of the third field is "72", the base station determines that the quantity N of the subbands obtained through division is 18, and each subband includes four RBs.

Optionally, the first field and the second field may be sent to the terminal device by using a same piece of signaling, or the first field and the second field are separately sent to the terminal device by using two pieces of signaling. The signaling includes but is not limited to DCI signaling, MAC signaling, or RRC signaling.

Manner 2

Figure 5:
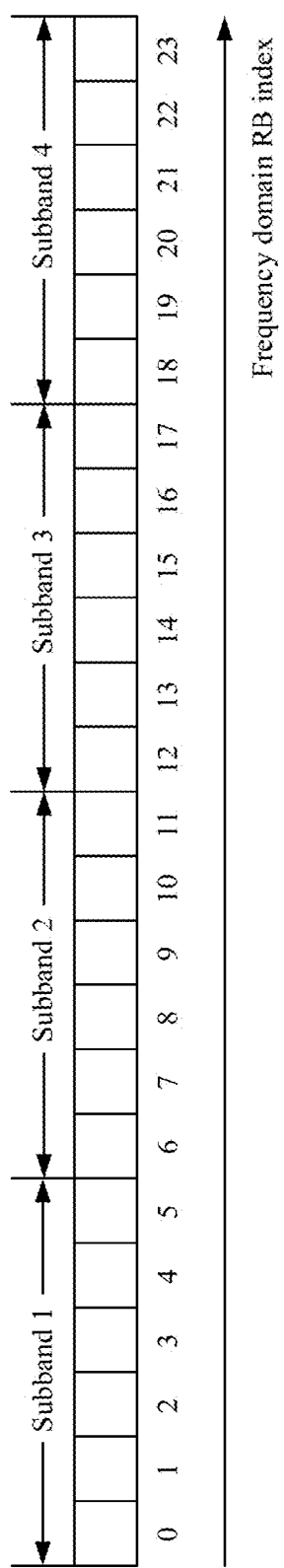
FIG. 5 is a schematic diagram of a frequency domain resource of a BWP according to an embodiment of this disclosure.

In the foregoing manner 1, based on a subband division method in which the size of each subband is expressed in a quantity of RBGs, when a large quantity of RBGs need to be allocated to the terminal device, in other words, there are a large quantity of subbands, overheads for indicating different subband precoding are high. For example, as shown in FIG. 5, if a BWP size is 24 RBs, corresponding frequency domain RB indexes are 0 to 23, and six RBs are used as one subband for division, a BWP may include four subbands, that is, N=4. In this case, all resources of the entire BWP are uplink resources used for transmission and scheduling.

In Manner 2, if some resources of the BWP are used to schedule the uplink resource, the network device indicates only a frequency domain resource used for scheduling, and does not indicate a frequency domain resource not participating in scheduling, so that indication signaling overheads can be reduced. The frequency domain resource for scheduling is a frequency domain resource actually allocated to the terminal device when the network device schedules the terminal device at a moment, and bandwidth of the frequency domain resource is less than or equal to the BWP.

Figure 6:
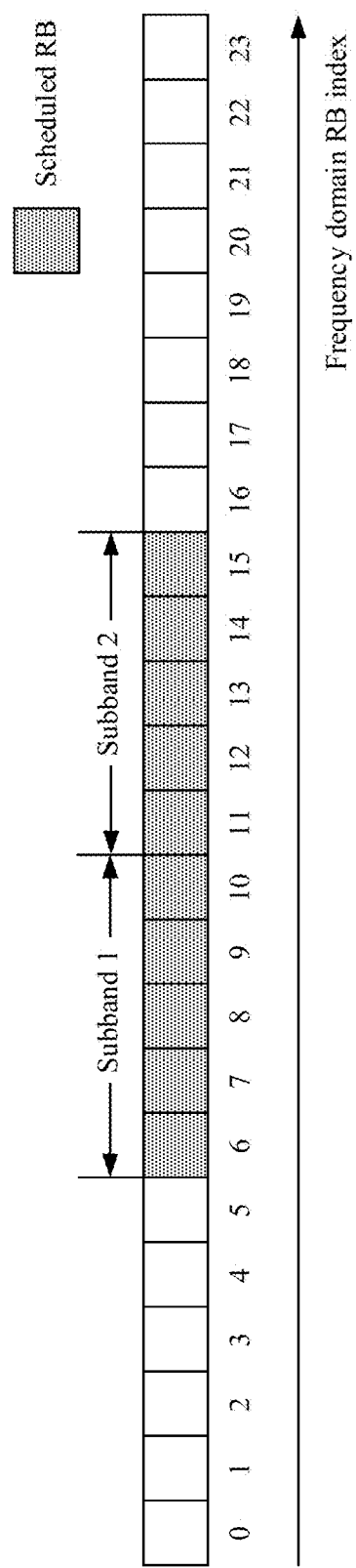
FIG. 6 is a schematic diagram of a consecutively scheduled frequency domain resource according to an embodiment of this disclosure.

Specifically, as shown in FIG. 6, in 24 RBs, there are a total of consecutive 10 RBs used for scheduling, and corresponding frequency domain RB indexes are 5 to 15. If division is fixedly performed based on two subbands (a subband 1 and a subband 2), that is, N=2, each subband includes five RBs. The network device indicates, by using the second field, that the quantity N of the subbands is 2.

Figure 7:
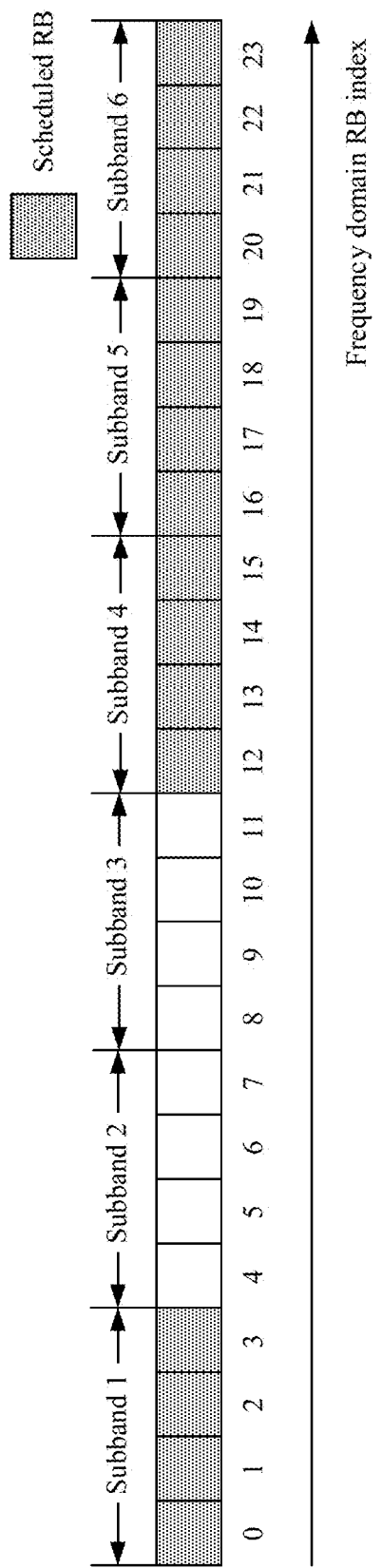
FIG. 7 is a schematic diagram of a non-consecutively scheduled frequency domain resource according to an embodiment of this disclosure.

In addition, when scheduled RBs are non-consecutive, as shown in FIG. 7, there are a total of 16 scheduled RBs whose RB indexes are 0 to 3 and RB indexes are 12 to 23. If each subband includes four RBs, that is, the size of each subband is expressed in a quantity of RBGs, and each RBG includes four RBs, six subbands are obtained through division, that is, N=6. In addition, a subband 1, and a subband 4 to a subband 6 are subbands used to transmit the uplink data. In this case, the second field indicates that the quantity N of the subbands is 6.

Optionally, the second field is "subbandNumberForPrecoding", and content of the second field may be a set, including 2, 4, 6, 8, and the like. The network device may select a number from the set as the quantity N of the subbands.

In addition, the second configuration information further carries indication information indicating at least one of a frequency domain starting position of each resource unit, a frequency domain ending position of each resource unit, and the size of the resource unit, that is, indicate a start RB index of each subband. For example, in a frequency domain resource shown in FIG. 6, the second configuration information further includes a fourth field, where the fourth field indicates any one of the following cases for consecutive scheduled RBs:

1. A start RB index is 6 and an end RB index is 15.
2. A start RB index is 6, and a quantity of consecutive RBs is 10.
3. An end RB index is 15, and a quantity of consecutive RBs is 10.

Figures 8, 9:
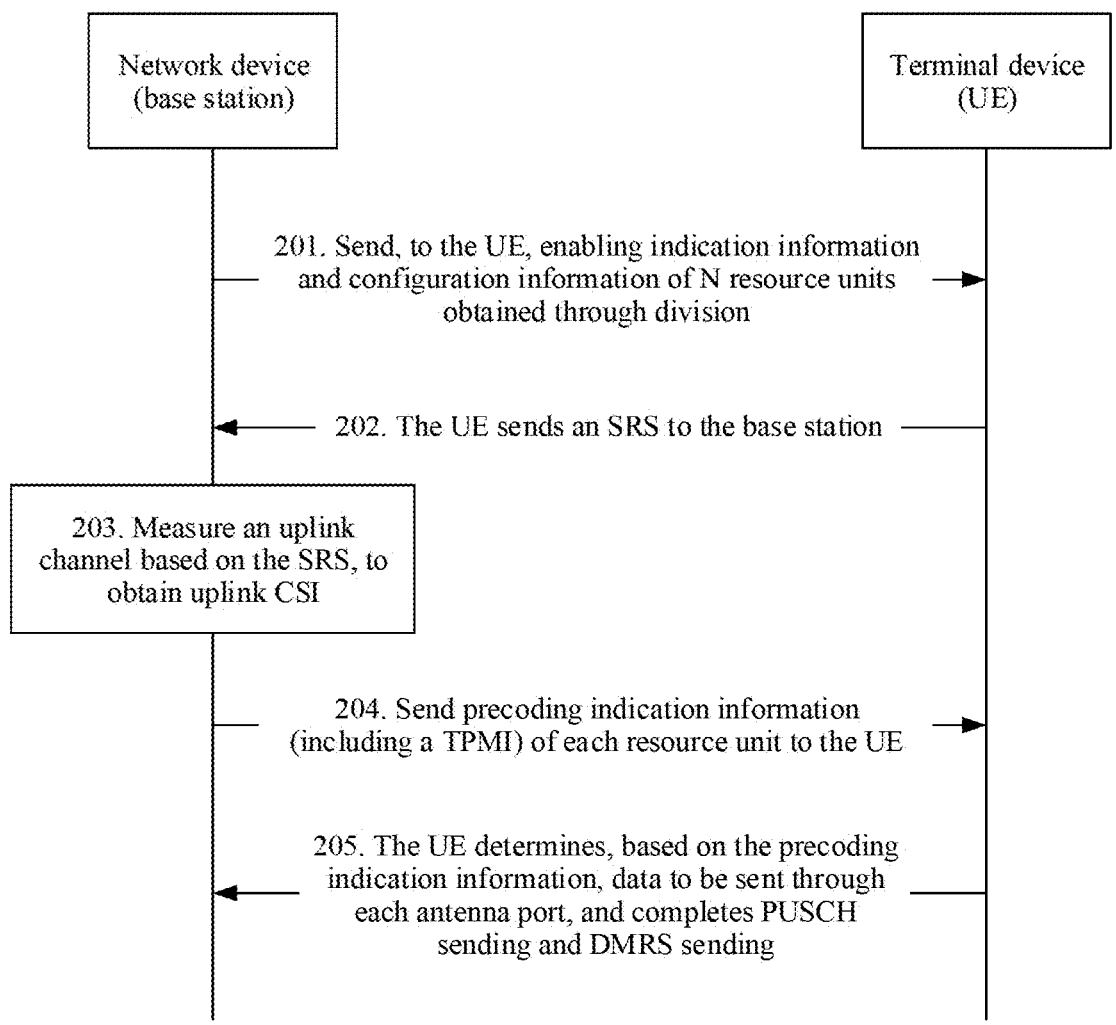
FIG. 8 is a schematic diagram of indicating a scheduled RBG by using a bitmap according to an embodiment of this disclosure.
FIG. 9 is a signaling flowchart of an information sending method in a codebook-based transmission mode according to an embodiment of this disclosure.

Optionally, a resource scheduling granularity is expressed in a quantity of RBGs, that is, Resource allocation 0 in a corresponding protocol. An RBG numbering rule is the same as that in an existing standard. The network device may indicate, by using a bitmap, whether each RBG is allocated to the terminal device. For example, as shown in FIG. 8, binary bits "0" and "1" are used for indication. If a binary bit indicated by the bitmap is "1", it indicates that a subband in which "1" is located is an RBG used for scheduling. If a binary bit indicated by the bitmap is "0", it indicates that a subband in which "0" is located is an RBG not used for scheduling. The terminal device knows, based on the indication of the bitmap, RBGs that are allocated to the terminal device and that are used for scheduling. Therefore, during subsequent precoding information indication, the network device only needs to indicate precoding information of an allocated RBG.

The terminal device may determine, based on the fourth field and the second field, a quantity of the subbands obtained through division, a size of each subband, and a position of a scheduled subband.

Similarly, in a frequency domain resource shown in FIG. 7, for non-consecutive RB resources, the fourth field indicates a starting position of a scheduled RB. For example, a start RB index of a first segment of the frequency domain resource is 0, and an end RB index is 3; and a start RB index of a second segment of the frequency domain resource is 12, and an end RB index is 23.

After determining the second configuration information, the network device may send, to the terminal device by using the RRC signaling, the DCI signaling, or the MAC signaling, the second field and the fourth field that are carried in the second configuration information. Then, the network device sends the first configuration information, where the first configuration information includes the first field. Alternatively, the network device may send the first field, the second field, and the fourth field to the terminal device by using any one of the foregoing signaling. Specifically, for content of the first field and an indication manner, refer to the foregoing descriptions of "enabling precoding indication", and details are not described herein again.

In this implementation, the network device notifies the terminal device of the quantity and the sizes of the subbands obtained through division based on the joint indication of the first field and the second field, that is, joint indication of the "enabling indication" and the "quantity N of the subbands", to lay a foundation for subsequent subband precoding determining. In addition, the network device may alternatively use only the second field for indication.

Specifically, in another implementation, the network device sends, to the terminal device, only the second configuration information carrying the second field, and does not send, to the terminal device, the first configuration information carrying the first field. In this case, both the terminal device and the network device know that when receiving the second field indicating the quantity N of the subbands, the terminal device and the network device perform precoding processing by using subband precoding.

In addition, when an RB used for scheduling is indicated, signaling from the network device further includes the fourth field, and the fourth field indicates a position of the scheduled RB, to help the terminal device determine a resource position of the RB used for scheduling.

It should be noted that a process in which the terminal device receives the first configuration information and the second configuration information from the network device, and determines, based on the first field carried in the first configuration information, and the second field, the third field, and the fourth field that are carried in the second configuration information, the quantity N of the resource units obtained through division by the network device and the size of each resource unit is the same as the foregoing process in which the network device determines N and the size of each resource unit. The determining process of the terminal device is not described in detail again in this embodiment.

After the network device determines the size of each resource unit obtained through division and the quantity N of the resource units, the method further includes: The network device determines a precoding matrix of each resource unit, and determines precoding indication information corresponding to the precoding matrix of each resource unit, where each piece of precoding indication information indicates a precoding matrix of one corresponding resource unit.

Specifically, for the codebook-based transmission mode and the non-codebook-based transmission mode, processes in which the network device determines the precoding indication information of each resource unit are different. The following separately describes a process of determining the precoding indication information in each transmission mode.

I. Process of Determining Precoding Indication Information in a Codebook-Based Transmission Mode As shown in FIG. 9, in a specific embodiment, a network device is a base station, a terminal device is UE, and the method includes the following steps.

201. The base station sends, to the UE, enabling indication information and configuration information of N resource units obtained through division.

Specifically, the enabling indication information may be configured by using the foregoing first field, and the configuration information of the N resource units may be configured by using the foregoing second field and the foregoing third field or the foregoing fourth field. In addition, the first field and the second field to the fourth field may be sent by using any one of RRC signaling, DCI signaling, or MAC signaling.

Correspondingly, the UE receives the signaling from the base station, where the signaling includes the enabling indication information and the configuration information of the N resource units. In addition, the enabling indication information may be configured by using the first field, and the configuration information of the N resource units may be configured by using the second field. For a specific configuration process, refer to the descriptions in the foregoing embodiment. Details are not described again.

The enabling indication information is optional information.

202. The UE sends an SRS to the base station. Correspondingly, the base station receives the SRS from the UE.

Specifically, the UE may send, in a manner supported by a current standard, the sounding reference signal (SRS) used for uplink CSI measurement. The SRS is used to measure uplink CSI.

It should be noted that a sequence of step 201 and step 202 may be changed, and the sequence of step 201 and step 202 is not limited in this embodiment.

203. The base station measures an uplink channel based on the SRS, to obtain uplink channel state information (CSI). The base station completes CSI measurement based on the SRS, to obtain a CQI, a rank indicator (RI), and precoding indication information of each subband. Further, a method for measuring the CQI and the RI may be obtained based on a method supported by the current standard.

In an embodiment, a process in which the base station determines a precoding matrix of each subband in step 203 specifically includes the following.

203-1. The base station obtains a channel matrix of the UE on each subband based on the reference signal SRS through channel estimation, traverses at least one precoding matrix in a first codebook set based on the channel matrix on each subband, and determines the precoding matrix of each subband from the at least one precoding matrix based on a capacity maximization criterion.

In step 203-1, for the codebook-based transmission mode, the base station needs to measure subband precoding. The first codebook set is known by both a user side and a base station side.

In a specific example, a codebook selected when a quantity of PUSCH transmission layers is 1 is used as an example. It is assumed that power on an $m^{th}$ resource unit of a user k is $p_{k,m}$, and a signal to interference plus noise ratio (SINR) of the $m^{th}$ resource unit is $\gamma_{k,m}$. A channel on the $m^{th}$ resource unit of the user k is $H_{k,m}$, and $H_{k,m}$ also indicates a channel matrix from the user to a serving base station. It is assumed that the SRS received by the base station is $y_{k,m}$:

$$y_{k,m} = p_{k,m} H_{k,m} w_{k,m} s_{k,m} + I_{k,m} + \sigma^2 \quad (1)$$

where $s_{k,m}$ indicates data sent by the user k on the $m^{th}$ resource unit, and satisfies $E[s_{k,m})^H s_{k,m}] = 1$, $E[\cdot]$ indicates a calculation expectation; $(\cdot)^H$ indicates a calculation conjugate transpose; $g_{k,m}$ indicates a weight coefficient of a receive antenna of the base station; $w_{k,m}$ indicates a precoding matrix of the user k on the $m^{th}$ resource unit, where for example, a matched filtering method is used to perform solving, and it may be obtained that $g_{k,m} = (H_{k,m} w_k)^H$; $I_{k,m}$ indicates an inter-cell interference covariance matrix; and $\sigma^2$ is noise power.

It should be understood that, in an actual system, the base station receives, on each subcarrier, a signal similar to that in the foregoing Formula (1). Therefore, an SINR of each subcarrier may be calculated, to obtain an average SINR of each resource unit.

Single stream transmission is used as an example, and an SINR $\gamma_{k,m}$ on the $m^{th}$ resource unit is defined as:

$$\gamma_{k,m} = \frac{p_{k,m} \cdot |g_{k,m} H_{k,m} w_{k,m}|^2}{|g_{k,m}(I_{k,m} + \sigma^2)|^2} \quad (2)$$

It should be noted that, in the foregoing Formula (2), precoding matrices of different resource units may be different. Therefore, a precoding matrix $w_{k,m}$ corresponding to each resource unit may be calculated by using the capacity maximization criterion, and is expressed as:

$$\arg\max\{\log_2(1+\gamma_{k,m})\} \quad (3)$$

According to the foregoing Formula (2), it can be learned that $\gamma_{k,m}$ in the Formula (3) is related to $w_{k,m}$, $w_{k,m} \in \Phi$, $\Phi$ is a precoding matrix set, and arg max{ ... } indicates a MAX operation. The set includes the precoding matrix of each resource unit, and therefore only capacity maximization on a current resource unit needs to be satisfied. It should be noted that, using of the capacity maximization criterion is only a means for obtaining the precoding matrix, and another means or method may also be considered to obtain the precoding matrix.

203-2. The base station determines a TPMI index of a codebook used for precoding of each subband.

Specifically, the base station determines, based on a mapping relationship between each precoding matrix and a codebook index, the TPMI index of the codebook corresponding to each precoding matrix.

For example, in an NR standard, a codebook set is provided, and the codebook set is defined as follows: In this embodiment, for example, the terminal device uses a codebook with two antenna ports. The following Table 2 and Table 3 respectively provide codebooks used by the terminal device when quantities of transmission layers are 1 and 2. A TPMI index indicates an index of a corresponding codebook, and TPMI indexes are sorted in ascending order from left to right.

TABLE 2

Correspondence between a TPMI index and a precoding matrix when a quantity of antenna ports is 2 and a quantity of transmission layers is 1

| TPMI index | Precoding matrix w (in ascending order of TPMI indexes from left to right) | | | | | | | |
|---|---|---|---|---|---|---|---|---|
| 0 to 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

TABLE 3

Correspondence between a TPMI index and a precoding matrix when a quantity of antenna ports is 2 and a quantity of transmission layers is 2

| TPMI index | Precoding matrix w (in ascending order of TPMI indexes from left to right) | | |
|---|---|---|---|
| 0 to 2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

After determining a TPMI index of each resource unit, the base station needs to indicate the TPMI index before the UE sends a PUSCH, to notify the UE of a specific codebook index that should be selected to perform precoding processing.

204. The base station sends precoding indication information of each resource unit to the UE. Correspondingly, the UE receives the precoding indication information from the base station.

The precoding indication information includes the TPMI index corresponding to each precoding matrix. Specifically, the base station sends the TPMI index by using a DCI. For example, the base station indicates the TPMI index by using DCI format 0_1, and a bit length of the indication field is related to a transmission mode, a value of a transmission rank, and a quantity of antenna ports. For example, if a higher layer parameter, namely, txConfig, is configured as nonCodebook (configured by using the RRC signaling), it indicates that a non-codebook-based transmission mode is used, and the TPMI does not need to be indicated. In this case, the bit length is 0. If txConfig is configured as Codebook, it indicates that the codebook-based transmission mode is used, and the bit length of the corresponding indication field is related to a quantity of elements in the codebook set. Selection of the codebook set is related to an antenna port, a transmission rank, a quantity of antenna ports, a waveform, and the like.

Optionally, the TPMI index is not limited to being sent by using the DCI, and may alternatively be carried by using the MAC signaling or the RRC signaling.

In addition, the precoding indication information further includes information such as a time-frequency resource allocation indication, a modulation and coding index, and power control.

It should be noted that step 204 is equivalent to step 101 in the foregoing embodiment. A difference between a process in which the base station sends the precoding indication information of each resource unit to the UE and step 101 lies in that a first field indicating to enable precoding is not sent in step 204, but is sent, in step 201, to the UE by using signaling. In addition, the precoding indication information of each resource unit may be configured by using the first configuration information in the foregoing embodiment.

205. The UE determines, based on the precoding indication information, data to be sent through each antenna port, and completes PUSCH sending and DMRS sending.

Specifically, the UE determines the precoding matrix of each subband based on the TPMI index carried in the precoding indication information. The UE performs data mapping by using the precoding matrix of each subband, generates the data to be sent through each antenna port, to complete the PUSCH sending.

After the UE determines the precoding matrix, a process of mapping the to-be-transmitted data to each antenna port by using the precoding matrix is:

$$\begin{bmatrix} z^{(p_0)}(i) \\ \vdots \\ z^{(p_{P-1})}(i) \end{bmatrix} = W \begin{bmatrix} y^{(0)}(i) \\ \vdots \\ y^{(v-1)}(i) \end{bmatrix} \quad (4)$$

where w is the precoding matrix provided in Table 2 or Table 3, $y^{(v-1)}(i)$ is data on which the precoding processing is not performed, l is a layer index, $z^{(p_{P-1})}(i)$ is data on which the precoding matrix processing is performed, that is, data on a corresponding antenna port $p_{P-1}$, and i is an index of a modulation symbol. When a quantity of antenna ports is 2 and a quantity of transmission layers is 1, the data on which the precoding matrix processing is performed is:

$$\begin{bmatrix} z^{(p_0)}(i) \\ \vdots \\ z^{(p_0+1)}(i) \end{bmatrix} = w \cdot y^{(0)}(i) \quad (5)$$

When a quantity of antenna ports is 1, w is 1 by default. In this case, the data on which the precoding processing is performed and the data on which the precoding processing is not performed are the same.

In addition, a DMRS that is in a same resource unit as the data on which the precoding processing is performed also needs to use a precoding matrix the same as that of the data, and the DMRS is from the terminal device to the base station, so that the base station performs channel estimation and data demodulation.

In the method provided in this embodiment, a subband precoding design and a subband division design help match channel changes in different frequency domains when the terminal device sends the PUSCH, and enhance a receive SINR of the PUSCH, thereby improving an uplink edge user throughput and an average uplink cell throughput. In addition, in a multi-user pairing and coordination scenario, inter-cell interference is reduced in the method.

The technical solutions in this embodiment support uplink PUSCH transmission based on subband precoding. In addition, a quantity of subbands and a size of each subband are further configured, so that flexible precision division and control are implemented, thereby facilitating adaptation to different coherence bandwidth sizes. In addition, a quantity and sizes of subbands used only for scheduling in one transmission are indicated, thereby further reducing signaling overheads.

Figure 10:
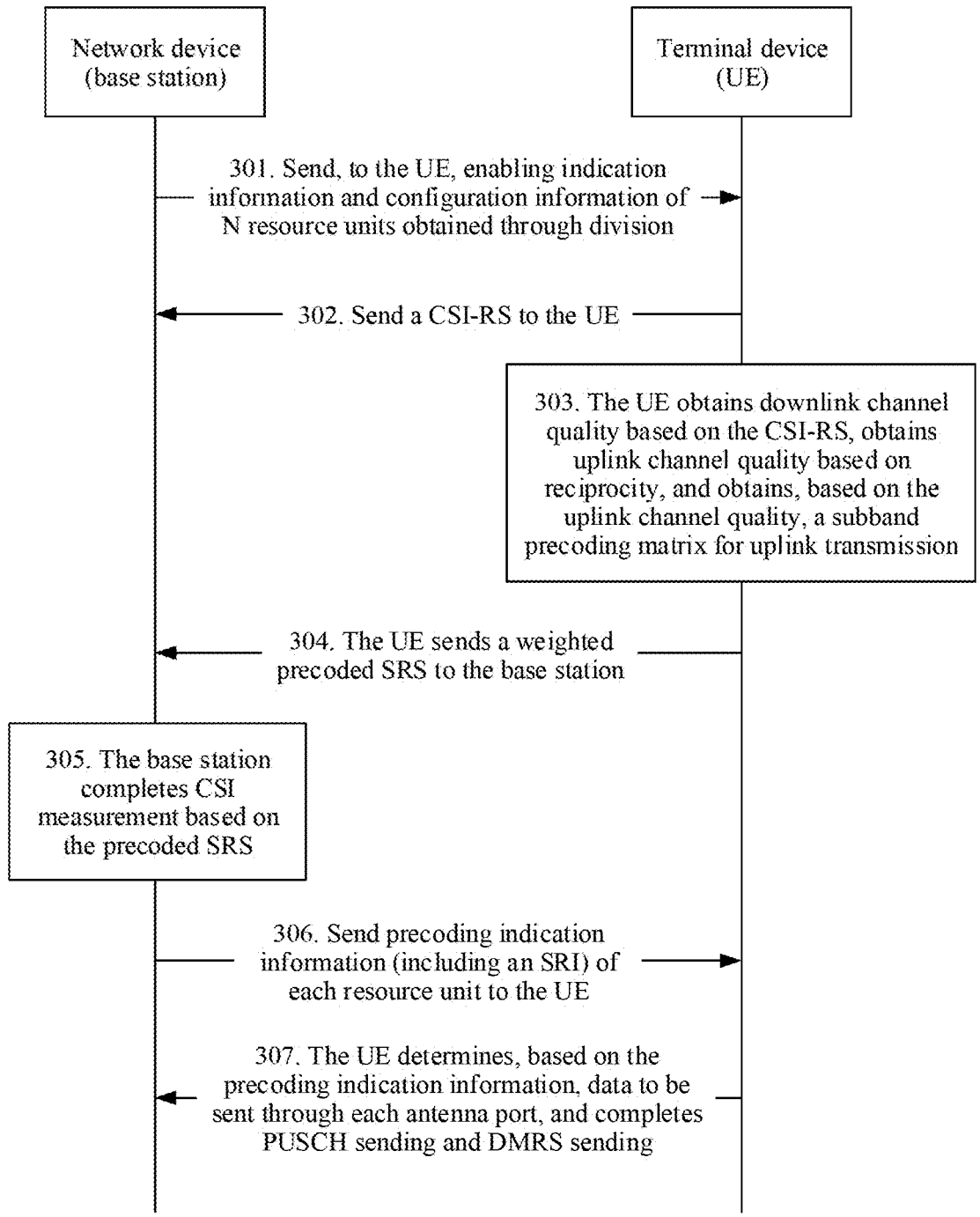
FIG. 10 is a signaling flowchart of an information sending method in a non-codebook-based transmission mode according to an embodiment of this disclosure.

II. Process of Determining Precoding Indication Information in a Non-Codebook-Based Transmission Mode In the non-codebook-based transmission mode, precoding indication information that is of each resource unit and that is sent by a base station to UE is indicated by using an SRI instead of a TPMI. Specifically, as shown in FIG. 10, the method includes the following steps.

301. The base station sends, to the UE, enabling indication information and configuration information of N resource units obtained through division.

Specifically, step 301 is the same as step 201 in the foregoing embodiment, and details are not described herein again.

302. The base station sends a channel state information reference signal (CSI-RS) to the UE, where the CSI-RS is used to measure a downlink channel Correspondingly, the UE receives the CSI-RS from the base station.

303. The UE obtains downlink channel quality based on the CSI-RS, obtains uplink channel quality based on reciprocity between an uplink channel and a downlink channel, and obtains, based on the uplink channel quality, a subband precoding matrix for uplink transmission.

Specifically, step 303 includes the following:

303-1. The UE receives the CSI-RS from the base station, and obtains the downlink channel quality based on the CSI-RS.

303-2. The UE obtains the uplink channel quality based on the channel reciprocity, that is, a feature of the downlink channel is the same as or similar to a feature of the uplink channel. A method for the UE to determine an uplink precoding matrix is as follows: The UE performs eigenvalue decomposition on the downlink channel, and may use an eigenvector obtained through decomposition as precoding.

303-3. The UE obtains, based on the uplink channel quality and subbands obtained through division, each uplink subband precoding matrix.

303-4. The UE obtains a weighted precoded SRS of each subband based on each subband precoding matrix.

304. The UE sends the weighted precoded SRS to the base station.

Sending of the precoded SRS specifically includes: In a current protocol, sending of only a wideband precoded SRS is supported. For sending of a subband precoded SRS, weight vectors on different subbands may be different.

The following describes a manner of sending the precoded SRS by using an example in which one subband includes four RBs. It should be noted that a quantity of RBs included in the subband is an integer multiple of bandwidth. Preferably, the quantity of RBs included in the subband is configured to an integer multiple of minimum transmit bandwidth of the SRS. For example, the minimum transmit bandwidth of the SRS is four RBs, and a size of the subband may be preferably configured to (m×4) RBs. In addition, scanning bandwidth, a quantity of OFDM symbols, a frequency hopping pattern, and the like of the SRS may all be configured by using an RRC layer parameter.

During system implementation, when sending the precoded SRS, the UE needs to know a subband division rule and a precoding vector of each subband. The subband division rule is notified by using RRC signaling in step 301, and the precoding vector of the subband is obtained through step 303-3.

305. The base station receives the precoded SRS from the UE, and completes CSI measurement based on the precoded SRS. That the base station completes the CSI measurement includes: The base station selects a CQI, an RI, and an optimal SRI that is of each subband.

The base station selects the optimal SRI and completes uplink resource scheduling. A selection criterion is similar to the foregoing Formula (3).

In the foregoing Formula (2), a channel obtained by the base station through estimation is a precoded channel, that is, $H_{k,m}^{SRI_j} = H_{k,m} w_k^{SRI_j}$, where $w_k^{SRI_j}$ indicates a precoding matrix corresponding to a $j^{th}$ resource unit, and optionally, $w_k^{SRI_j}$ may be obtained through calculation in step 303.

306. The base station sends precoding indication information of each resource unit to the UE. Correspondingly, the UE receives the precoding indication information from the base station.

The base station sends, to the UE, the optimal SRI of each subband. Each subband corresponds to one optimal SRI, and N subbands correspond to N optimal SRIs. The base station sends the N optimal SRIs to the UE by using DCI signaling.

Specifically, each of the optimal SRIs may be indicated by a field, namely, SRS resource indicator, in DCI format 0_1. A bit length of each field is related to a quantity of configured SRS resources and a maximum quantity of uplink transmission layers. The bit length is indicated by using a lowercase letter "n", and an expression of the bit length n is as follows:

$$n = \left\lceil \log_2 \left( \sum_{k=j}^{\min\{L_{max}, N_{SRS}\}} \binom{N_{SRS}}{j} \right) \right\rceil \quad (6)$$

where $L_{max}$ is the maximum quantity of transmission layers that can be supported by the UE and that is configured by using RRC signaling, $N_{SRS}$ is a quantity of resource units of an SRS that are configured by using RRC layer signaling, a value range of j is $1 \leq j \leq \min\{L_{max}, N_{SRS}\}$, and $\lceil \ldots \rceil$ indicates rounding up.

When calculating subband precoding and sending the SRS, the UE cannot determine a quantity of RBs scheduled by the base station. Therefore, subband division related to scheduled bandwidth needs to be modified as follows:

When a resource allocation type is configured as Resource allocation 0, a method in a current standard is still used for subband division in which the size of each subband is expressed in a quantity of RBGs. When the resource allocation type is configured as Resource allocation 1, a division method in which the size of each subband is expressed in a quantity of RBGs is still used for subband division, that is, the subband division is still bound to a BWP size. For a specific correspondence, refer to the foregoing Table 1.

The following modification may be made to a subband division manner in which a quantity of subbands is predefined based on the scheduled bandwidth. In a process of configuring a quantity and sizes of subbands, RRC layer signaling may be used to select one candidate quantity from a plurality of candidate quantities of subbands, and deliver the one candidate quantity to the terminal device. It is assumed that a quantity of preconfigured subbands is N, a size $P_{nomial}'$ of each subband is $$\left\lceil \frac{RB_{end}^{BWP} - RB_{start}^{BWP} + 1}{N} \right\rceil,$$

where $RB_{start}^{BWP}$ a first RB index of a currently configured BWP, $RB_{end}^{BWP}$ is a last RB index, and both the base station and the terminal device know the first RB index and the last RB index.

An RB index set corresponding to a first subband is $\{RB_{start}^{BWP}, RB_{start}^{BWP}+1, \ldots, RB_{start}^{BWP}+P_{nomial}'\}$. An RB index set corresponding to an $m^{th}$ subband is $\{RB_{start}^{BWP}+(m-1) \cdot P_{nomial}', RB_{start}^{BWP}+(m-1) \cdot P_{nomial}'+1, \ldots, RB_{start}^{BWP}+m \cdot P_{nomial}'\}$, and $1 \leq m < N$. An RB index set of an $N^{th}$ subband is $\{RB_{start}^{BWP}+(N-1) \cdot P_{nomial}', RB_{start}^{BWP}+(N-1) \cdot P_{nomial}'+1, \ldots, RB_{start}^{BWP}\}$.

A quantity of RBs included in the $N^{th}$ subband may be less than $P_{nomial}'$.

It should be understood that the foregoing indications of the RB index set and the size of the subband are also applicable to the foregoing embodiment of the codebook-based transmission mode.

In step 306, when sending the precoding indication information, the base station actually indicates the optimal SRI of each subband. Because the precoding matrix is prestored on a UE side, each precoding matrix is associated with one SRS resource. The indication of the optimal SRI of each subband is shown in Table 4.

TABLE 4

Subband-based SRI indication

| Name | Description |
| --- | --- |
| Subband 1 | An optimal SRI is indicated by using a bit length, namely, n. For details, refer to Formula (6). |
| Subband 2 | Same as above |
| ... | ... |
| Subband M | Same as above |

307. The UE determines, based on the precoding indication information, data to be sent through each antenna port, and completes PUSCH sending and DMRS sending.

Specifically, the UE obtains the optimal SRI of each subband carried in the precoding indication information, determines, based on each SRI, the precoding matrix corresponding to each subband, performs mapping on uplink data on each subband based on the precoding matrix, to obtain to-be-transmitted uplink data, and sends the to-be-transmitted uplink data to the base station.

Specifically, a process in which the UE processes the uplink data based on the precoding matrix of each subband and sends the uplink data is the same as that in the foregoing embodiment, and details are not described herein again.

In the method provided in this embodiment, subband-based non-codebook-based uplink PUSCH transmission helps match rippling and changes of a frequency-domain channel. In addition, subband division methods with different precision and overheads are further provided, thereby facilitating adaptation to different coherence bandwidth sizes and reducing signaling overheads.

In addition, in "I. Process of determining precoding indication information in a codebook-based transmission mode" that is described above, when the precoding matrix of each subband is determined in step 203-1, the method further includes:

The base station determines a second codebook set, where the second codebook set is a subset of the first codebook set. Specifically, in an implementation, the base station may determine the second codebook set based on a quantity of antennas supported by the terminal device and the maximum quantity of transmission layers supported by the terminal device.

Specifically, a TPMI index range corresponding to an uplink first codebook set is shown in Table 5.

TABLE 5

Correspondence among a TPMI index range, a quantity of antenna ports, and a transmission rank or a quantity of transmission layers

| Quantity of antenna ports | Transmission rank or quantity of transmission layers | TPMI index range |
|---|---|---|
| 2 | 1 | 0 to 5 |
| 2 | 2 | 0 to 2 |
| 4 | 1 | 0 to 27 |
| 4 | 2 | 0 to 21 |
| 4 | 3 | 0 to 6 |
| 4 | 4 | 0 to 4 |

It can be learned from Table 5 that when a value of the transmission rank or the quantity of transmission layers is small, a quantity of TPMI indexes is large, and therefore a quantity of bits for indication is also large. When the terminal device is stationary or moves at a low speed, a channel is in a slowly changing state, the precoding matrix of each subband changes slowly with time, and the precoding matrix of each subband may be located in several elements in a codebook set instead of the entire codebook set. Therefore, through training for a period of time, the base station may obtain, through statistics collection, precoding matrices with higher probabilities of use, and form a codebook set, that is, the second codebook set, by using TPMI indexes corresponding to these precoding matrices. The second codebook set is a subset of an original codebook set (the first codebook set).

The base station determines the precoding matrix of each subband from the second codebook set.

In addition, the method further includes: The base station sends first signaling to the terminal device, where the first signaling indicates the second codebook set corresponding to the precoding matrix.

Specifically, the first signaling includes a codebook set restriction field, namely, "codebookSubsetRestrict", and the field, namely, codebookSubsetRestrict, indicates the UE to select a to-be-used codebook in a codebook subset restriction range.

Optionally, the first signaling may be RRC signaling or MAC signaling.

Further, when configuring the second codebook set by using the RRC signaling, the base station adds a field, namely, codebookSubsetRestrict, to a configuration information element (Config information element) of a PUSCH. Content of the field, namely, codebookSubset Restrict, may be determined based on a quantity of antennas supported by the terminal device and the maximum quantity of transmission rank layers. In addition, codebook set restriction may alternatively be indicated by using a variable such as bit-MapRestrict1. In other words, a selectable TPMI index is indicated by using a bitmap. For example, when a value of an $n^{th}$ bit of the bitmap is 1, it indicates that an $N^{th}$ TPMI index in the corresponding first codebook set may be selected or may not be selected. In addition, the codebook set restriction may be semi-statically changed by using RRC layer signaling, and is mainly configured based on a statistical characteristic of a channel and TPMI selection.

Based on an indication of the field, namely, codebookSubsetRestrict, both abase station side and a UE side know a current codebook subset, that is, the second codebook set, and update a TPMI index number of the second codebook set. For example, for 2T, the second codebook set used when a maximum value of the transmission rank is 1 may be shown in the following Table 6, and TPMI index numbers 0, 1, 4, and 5 are deleted. Then, remaining precoding matrices are renumbered, that is, new numbers are 0 and 1.

TABLE 6

| | Second codebook set | | | | | | |
|---|---|---|---|---|---|---|---|
| TPMI index | Precoding matrix w (in ascending order of TPMI indexes from left to right) | | | | | | |
| 0 to 1 | $\frac{1}{\sqrt{2}}\begin{bmatrix}1\\1\end{bmatrix}$ | $\frac{1}{\sqrt{2}}\begin{bmatrix}1\\-1\end{bmatrix}$ | — | — | — | — | — |

In a current NR standard, a TPMI index is indicated in a DCI, and is determined based on Table 7.3.1.1.2-2, Table 7.3.1.1.2-3, Table 7.3.1.1.2-4, Table 7.3.1.1.2-5, and Table 7.3.1.1.2-6 in 38.212. Table 7.3.1.1.2-5 is used as an example in this embodiment. It is assumed that a codebook set field, namely, "codebookSubset", of a higher layer parameter is configured as fullyAndPartialAndNonCoherent, and a TPMI index restricted by a codebook subset may be deleted. As shown in FIG. 11, the first codebook set needs to be indicated by using 3-bit overheads. After codebook set restriction is performed, the second codebook set includes TPMI indexes 2 and 3, only a 1-bit indication overhead is required. Compared with overheads before the restriction is performed, 2-bit overheads are reduced.

In this embodiment, in the codebook-based transmission mode, an indication of the codebook index is improved. With reference to a statistical characteristic of the channel change and by restricting TPMI index selection, a size of the codebook set is reduced, a new codebook set is generated, and a corresponding precoding matrix is determined in the new codebook set, to reduce signaling overheads.

The following describes apparatus embodiments corresponding to the foregoing method embodiments.

Figure 12:
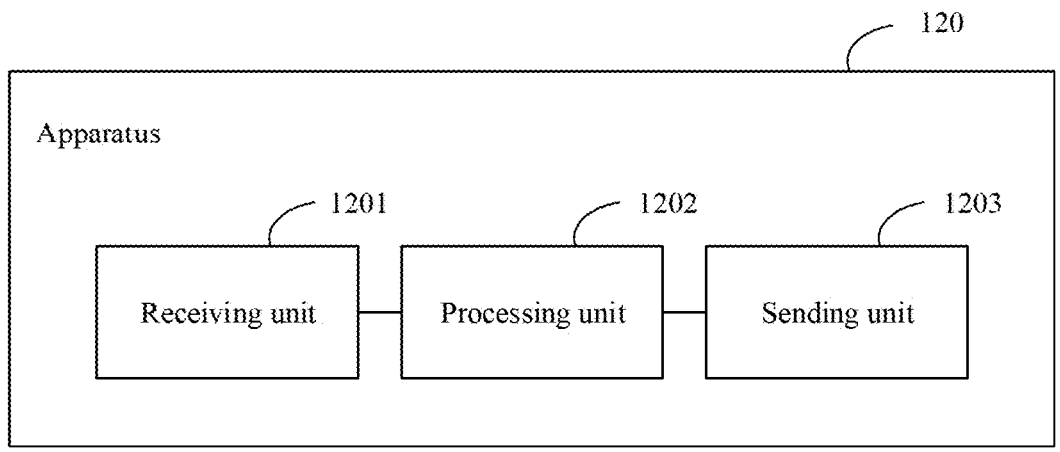
FIG. 12 is a schematic diagram of a structure of an information sending apparatus or information receiving apparatus according to an embodiment of this disclosure.

FIG. 12 is a schematic diagram of a structure of an apparatus according to an embodiment of this disclosure. The apparatus may be an information sending apparatus, for example, a network device or a component located in the network device, for example, a chip. In addition, the apparatus may alternatively be an information receiving apparatus, for example, a terminal device. In addition, the apparatus may implement all functions of the network device or the terminal device apparatus in the foregoing embodiments, and perform all steps in the information sending method and the information receiving method in the foregoing embodiments.

Further, as shown in FIG. 12, the apparatus 120 may include a receiving unit 1201, a processing unit 1202, and a sending unit 1203. In addition, the apparatus may further include a storage unit or another unit or module.

When the apparatus 120 is used as an information sending apparatus, the sending unit 1203 is configured to send first configuration information to a terminal device, where the first configuration information carries precoding indication information of each resource unit of N resource units allocated to the terminal device, N≥1, and N is a positive integer.

The precoding indication information includes information such as a TPMI or an SRI.

In a specific implementation, the first configuration information includes a first field, and the first field indicates the terminal device to perform precoding processing based on the first configuration information when transmitting uplink data.

The processing unit 1202 is configured to: determine a precoding matrix of each resource unit, and determine the precoding indication information corresponding to the precoding matrix of each resource unit, where each piece of precoding indication information indicates a precoding matrix of one corresponding resource unit.

Optionally, in a specific implementation, the receiving unit 1201 is configured to receive a reference signal from the terminal device; and the processing unit 1202 is specifically configured to: obtain a channel matrix of the terminal device on each resource unit based on the reference signal through channel estimation, traverse at least one precoding matrix in a first codebook set based on the channel matrix on each resource unit, and determine the precoding matrix of each resource unit from the at least one precoding matrix based on a capacity maximization criterion.

Optionally, in another specific implementation, the sending unit 1203 is further configured to send first signaling to the terminal device, where the first signaling indicates a second codebook set corresponding to the precoding matrix, and the second codebook set is a subset of the first codebook set.

Optionally, in still another specific implementation, the receiving unit 1201 is further configured to receive a precoded SRS from the terminal device; and the processing unit 1202 is specifically configured to perform channel state information CSI measurement based on the precoded SRS, to obtain the precoding matrix of each resource unit.

Optionally, in still another specific implementation, the sending unit 1203 is further configured to send second configuration information to the terminal device before sending the first configuration information, where the second configuration information carries a quantity N of the resource units allocated to the terminal device or a size of each resource unit, and indication information indicating a frequency domain starting position of each resource unit.

When the apparatus 120 is used as an information receiving apparatus, the receiving unit 1201 is configured to receive first configuration information from a network device, where the first configuration information carries precoding indication information of each resource unit of N resource units allocated to the terminal device apparatus, N≥1, and N is a positive integer. The processing unit 1202 is configured to perform precoding processing on uplink data carried on each resource unit by a precoding matrix corresponding to the precoding indication information of each resource unit, based on the first configuration information.

The precoding indication information includes a TPMI or an SRI.

Further, the processing unit 1202 is specifically configured to: perform data mapping by using the precoding matrix corresponding to each TPMI or SRI, determine the uplink data to be transmitted through each antenna port of the terminal device, and send the uplink data by using the sending unit 1203.

Optionally, in a specific implementation, the processing unit 1202 is further configured to: before performing the precoding processing on the uplink data carried on each resource unit, determine, based on the precoding indication information of each resource unit and a correspondence between the precoding indication information and a first codebook set, the precoding matrix corresponding to each resource unit, where the first codebook set includes at least one precoding matrix.

Further, the receiving unit 1201 is further configured to receive first signaling from the network device; and the processing unit 1202 is further configured to: determine a second codebook set based on the first signaling, and determine, from the second codebook set based on each piece of precoding indication information, the precoding matrix corresponding to each resource unit, where the second codebook set is a subset of the first codebook set.

Optionally, in another specific implementation, the receiving unit 1201 is further configured to receive second configuration information from the network device, where the second configuration information carries a quantity N of the resource units allocated to the apparatus or a size of each resource unit, and indication information indicating a frequency domain starting position of each resource unit.

The processing unit 1202 is further configured to: determine a position and the size of each resource unit based on the quantity N of the resource units and the indication information of the frequency domain starting position that are in the second configuration information; or determine the quantity N of the resource units and a position of each resource unit based on the size of each resource unit and the indication information of the frequency domain starting position that are in the second configuration information. Specifically, for a determining process, refer to the foregoing method embodiments. Details are not described herein again.

Optionally, in still another specific implementation, the receiving unit 1201 is further configured to receive a CSI-RS from the network device; and the processing unit 1202 is further configured to: measure downlink channel quality based on the CSI-RS, determine, based on the downlink channel quality, the precoding matrix corresponding to each resource unit, weight data of each resource unit based on the precoding matrix, to obtain a weighted precoded SRS, and send the weighted precoded SRS to the network device by using the sending unit 1203.

Figure 13:
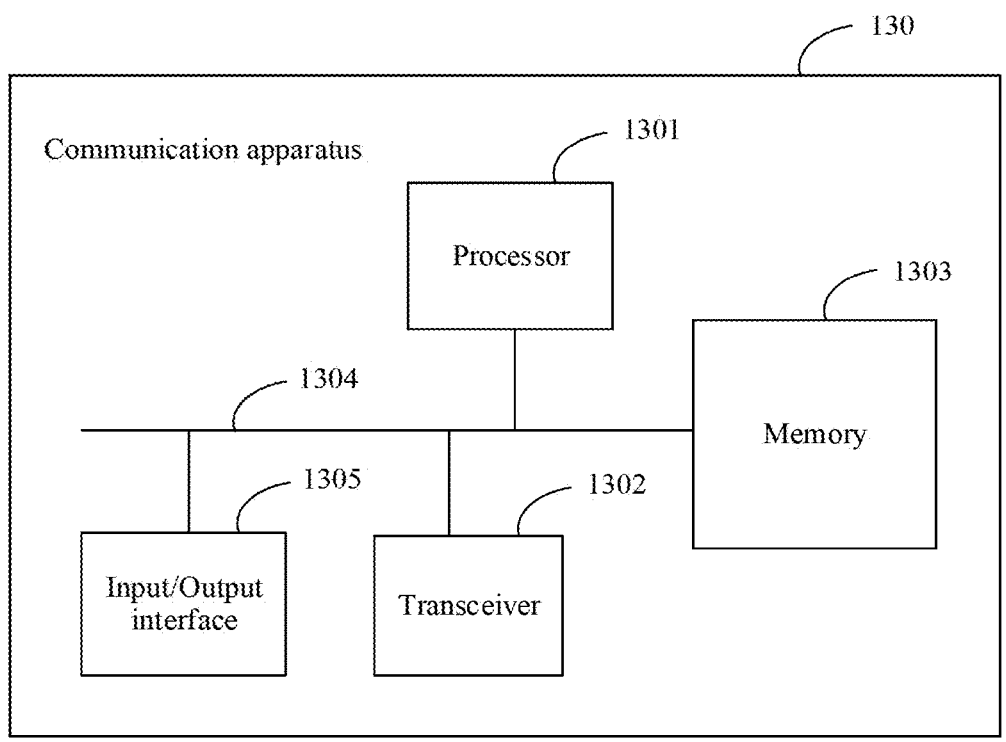
FIG. 13 is a schematic diagram of a structure of a communication apparatus according to an embodiment of this disclosure.

In addition, in a hardware implementation, as shown in FIG. 13, an embodiment further provides a communication apparatus. The apparatus may be a network device, for example, a base station, or may be a terminal device, for example, UE. Further, the communication apparatus includes a processor 1301, a transceiver 1302, a memory 1303, a communication bus 1304, and an input/output interface 1305.

The processor 1301 may include one or more processors, and the memory 1303 may include one or more memories. The memory 1303 stores instructions (or stores a computer program). The processor 1301 is connected to the transceiver 1302 through the input/output interface 1305. When the instructions stored in the memory 1303 are executed by the processor 1301, the processor controls the transceiver

1302 to send or receive data, the processor 1301 processes to-be-sent data and received data, and controls the data received by the transceiver 1302 to arrive at the processor 1301 through the input/output interface 1305. The processor 1301 sends the to-be-sent data to the transceiver 1302 through the input/output interface 1305, and then the transceiver 1302 sends the to-be-sent data.

In addition, the communication apparatus may further include more or fewer other components, or combine some components, or different components. This is not limited in this embodiment of this disclosure.

The transceiver 1302 is configured to establish a communication channel, so that the communication device is connected to a network through the communication channel, to implement communication transmission between the communication apparatus and another device. The transceiver 1302 may be a module that completes a transceiver function. For example, the transceiver may include a communication module such as a wireless local area network (WLAN) module, a Bluetooth module, or a baseband module, and a radio frequency (RF) circuit corresponding to the communication apparatus, and is configured to perform wireless local area network communication, Bluetooth communication, infrared communication, and/or cellular communications system communication, for example, wideband code division multiple access (WCDMA) and/or high speed downlink packet access (HSDPA). The transceiver 1302 is configured to control communication between components in the communication device, and may support direct memory access.

In different implementations of this disclosure, transceiver modules in the transceiver 1302 generally appear as integrated circuit chips, and may be combined selectively, and not all of the transceiver modules and corresponding antenna groups are necessarily included. For example, the transceiver 1302 may include only a baseband chip, a radio frequency chip, and a corresponding antenna, to provide a communication function in a cellular communications system. The communication apparatus may be connected to a cellular network or the Internet through a communication connection, for example, wireless local area network access or WCDMA access, that is established by the transceiver.

The communication bus 1304 may include a path for transferring information between the foregoing components.

The processor 1301 is a control center of the communication apparatus 130, connects all parts of the entire device apparatus through various interfaces and lines, runs or executes a software program and/or a unit stored in the memory 1303, and invokes data stored in the memory 1303, to perform various functions of the communication apparatus and/or process data. Further, the processor 1301 may include an integrated circuit (IC), for example, may include a single packaged IC, or may include a plurality of connected packaged ICs that have a same function or different functions. For example, the processor 1301 may include only a combination of a central processing unit (CPU), a digital signal processor (DSP), and a control chip (such as a baseband chip) in the transceiver.

The memory 1303 may include a volatile memory, for example, a random access memory (RAM), and may further include a non-volatile memory, for example, a flash memory, a hard disk drive (HDD), or a solid-state drive (SSD). The memory 1303 may further include a combination of the foregoing types of memories. The memory may store a program or code, and the processor 1301 may implement a function of the communication apparatus by executing the program or the code. In addition, the memory 1303 may exist independently, and is connected to the processor 1301 through the communication bus 1304. Alternatively, the memory 1303 may be integrated with the processor 1301.

When the communication apparatus 130 shown in FIG. 13 is a chip, a function/implementation process of the input/output interface 1305 may alternatively be implemented by using a pin, a circuit, or the like. The memory 1303 is a storage unit in the chip, for example, a register or a cache. The storage unit may alternatively be a storage unit located outside the chip.

In this embodiment, when used as an information sending apparatus or an information receiving apparatus, the communication apparatus may implement method steps of all the network devices shown in FIG. 4, FIG. 9, and FIG. 10 in the foregoing embodiments. In addition, functions of the receiving unit 1201 and the sending unit 1203 in the apparatus 120 embodiment shown in FIG. 12 may be implemented by the transceiver 1302 and the input/output interface 1305, or may be implemented through controlling by the processor 1301; a function to be implemented by the processing unit 1202 may be implemented by the processor 1301; and a function of the storage unit may be implemented by the memory 1303.

Specifically, when the communication apparatus 130 is a network device, the transceiver 1302 is configured to send first configuration information to a terminal device, where the first configuration information carries precoding indication information of each resource unit of N resource units allocated to the terminal device, N≥1, and N is a positive integer.

In addition, in an implementation, the processor 1301 is further configured to: determine a precoding matrix of each resource unit, and determine precoding indication information corresponding to the precoding matrix of each resource unit, where each piece of precoding indication information indicates a precoding matrix of one corresponding resource unit.

In a specific implementation, the processor 1301 is specifically configured to: receive, by using the transceiver 1302, a reference signal from the terminal device, obtain a channel matrix of the terminal device on each resource unit based on the reference signal through channel estimation, traverse at least one precoding matrix in a first codebook set based on the channel matrix on each resource unit, and determine the precoding matrix of each resource unit from the at least one precoding matrix based on a capacity maximization criterion.

In another specific implementation, the transceiver 1302 is configured to send first signaling to the terminal device, where the first signaling indicates a second codebook set corresponding to the precoding matrix, and the second codebook set is a subset of the first codebook set.

In still another specific implementation, the transceiver 1302 is further configured to receive a precoded SRS from the terminal device; and the processor 1301 is further configured to perform channel state information CSI measurement based on the precoded SRS, to obtain the precoding matrix of each resource unit.

In still another specific implementation, the transceiver 1302 is further configured to send second configuration information to the terminal device, where the second configuration information carries a quantity N of the resource units allocated to the terminal device or a size of each resource unit. In addition, the second configuration information further carries indication information indicating a frequency domain starting position of each resource unit.

For specific determining processes in various implementations of the processor 1301 and the transceiver 1302, refer to the foregoing method embodiments and the various implementations in FIG. 4, FIG. 9, and FIG. 10 in this specification. Details are not described in this embodiment again.

It should be noted that, in this embodiment, a structure of the terminal device may be the same as a structure of the communication apparatus shown in FIG. 13. For example, the terminal device includes a communication interface, a communication bus, a transceiver, a processor, and a memory, and may further include another component or unit module. Structures and components of specific communication devices are not limited in this embodiment.

Further, when the communication apparatus 130 is used as a terminal device, the transceiver 1302 is configured to receive first configuration information from a network device, where the first configuration information carries precoding indication information of each resource unit of N resource units allocated to the terminal device, N≥1, and N is a positive integer. The processor 1301 is configured to perform precoding processing on uplink data carried on each resource unit by a precoding matrix corresponding to the precoding indication information of each resource unit, based on the first configuration information.

Further, the precoding indication information includes a TPMI or an SRI. The processor 1301 is specifically configured to: perform data mapping by using the precoding matrix corresponding to each TPMI or SRI, and determine the uplink data to be transmitted through each antenna port of the terminal device.

Optionally, in a specific implementation, the processor 1301 is further specifically configured to determine, based on the precoding indication information of each resource unit and a correspondence between the precoding indication information and a first codebook set, the precoding matrix corresponding to each resource unit, where the first codebook set includes at least one precoding matrix.

In another specific implementation, the transceiver 1302 is further configured to receive first signaling from the network device; and the processor 1301 determines a second codebook set based on the first signaling, where the second codebook set is a subset of the first codebook set; and determines, from the second codebook set based on each piece of precoding indication information, the precoding matrix corresponding to each resource unit.

In still another specific implementation, the transceiver 1302 is further configured to receive second configuration information from the network device; and the processor 1301 is specifically configured to determine a position and a size of each resource unit based on a quantity N of the resource units and indication information of a frequency domain starting position that are in the second configuration information; or determine a quantity N of the resource units and a position of each resource unit based on a size of each resource unit and indication information of a frequency domain starting position that are in the second configuration information.

In a specific implementation, the processor 1301 is further configured to: receive, by using the transceiver 1302, a CSI-RS from a network device, measure downlink channel quality based on the CSI-RS, determine, by using the downlink channel quality, the precoding matrix corresponding to each resource unit, weight data of each resource unit based on the precoding matrix, to obtain a weighted precoded SRS, and send the weighted precoded SRS to the network device by using the transceiver 1302.

An embodiment of this disclosure further provides a communication system. The system includes at least two communication apparatuses. The at least two communication apparatuses include one network device and at least one terminal device. The network device includes the information sending apparatus in the foregoing embodiments, and may be configured to implement the information sending method in the foregoing method embodiments. The terminal device includes the information receiving apparatus in the foregoing embodiments, and may be configured to implement the information receiving method in the foregoing method embodiments.

In addition, an embodiment of this disclosure further provides a computer storage medium. The computer storage medium may store programs. When the programs are executed, some or all of the steps of embodiments of the information sending method and the information receiving method provided in this disclosure may be included. The storage medium may be a magnetic disk, an optical disc, a read-only memory ROM, a random access memory RAM, or the like.

All or some of the foregoing embodiments may be implemented by using software, hardware, firmware, or any combination thereof. When software is used to implement embodiments, all or some of embodiments may be implemented in a form of a computer program product.

A computer program product includes one or more computer instructions, for example, sending instructions and receiving instructions. When a computer loads and executes the computer program instructions, all or some of the method procedures or functions are generated according to the embodiments of this disclosure. The computer may be a general-purpose computer, a dedicated computer, a computer network, or another programmable apparatus.

The computer instructions may be stored in a computer-readable storage medium, or may be transmitted from a computer-readable storage medium to another computer-readable storage medium. For example, the computer instructions may be transmitted from a network node, a computer, a server, or a data center to another website, computer, or server in a wired or wireless manner.

The computer-readable storage medium may be any usable medium accessible by the computer, or a storage device, for example, a server or a data center, integrating one or more usable media. The usable medium may be a magnetic medium, for example, a floppy disk, a hard disk, a magnetic tape, an optical medium (for example, a DVD), a semiconductor medium, for example, a solid-state drive SSD, or the like.

In the specification, claims, and accompanying drawings of this disclosure, the terms "first", "second", and so on are intended to distinguish between similar objects but do not necessarily indicate a specific order or sequence. Moreover, the terms "include", "including", or any other variant thereof are intended to cover a non-exclusive inclusion.

For same or similar parts in embodiments of this specification, refer to each other. Especially, embodiments related to the network device/terminal device or apparatus are basically similar to the method embodiments, and therefore are described briefly. For related parts, refer to the descriptions in the method embodiments.

The foregoing implementations of this disclosure are not intended to limit the protection scope of this disclosure.

What is claimed is:

1. An information receiving method comprising:
receiving, by a terminal device, first configuration information from a network device, wherein the first configuration information carries precoding indication information of each resource unit of N resource units allocated to the terminal device, N≥1, and N is an integer; and
performing, by the terminal device, precoding processing on uplink data carried on each of the N resource units by a precoding matrix corresponding to the precoding indication information of each of the N resource units, based on the first configuration information;
wherein before the performing of the precoding processing on t e uplink data carried on each of the N resource units, the method further comprises:
determining, by the terminal device based on the precoding indication information of each of the N resource units and a correspondence between the precoding indication information and a first codebook set, the precoding matrix corresponding to each of the N resource units, wherein the first codebook set comprises at least one precoding matrix; and
wherein before the determining of the precoding matrix corresponding to each of the N resource units, the method further comprises:
receiving, by the terminal device, first signaling from the network device; and
determining, by the terminal device, a second codebook set based on the first signaling, wherein the second codebook set is a subset of the first codebook set; and
the determining of the precoding matrix corresponding to each of the N resource units comprises:
determining, by the terminal device from the second codebook set based on each piece of precoding indication information, the precoding matrix corresponding to each of the N resource units.

2. The method according to claim 1, wherein the precoding indication information comprises a transmitted precoding matrix indicator TPMI; and
the performing, by the terminal device, of the precoding processing on the uplink data carried on each of the N resource units comprises:
performing, by the terminal device, data mapping by using the precoding matrix corresponding to each TPMI, and determining the uplink data to be transmitted through each antenna port of the terminal device.

3. The method according to claim 1, wherein the method further comprises:
receiving, by the terminal device, second configuration information from the network device, wherein the second configuration information carries a quantity N of the resource units allocated to the terminal device or a size of each of the N resource units, and indication information indicating a frequency domain starting position of each of the N resource units; and
determining, by the terminal device, a position and the size of each of the N resource units based on the quantity N of the resource units and the indication information of the frequency domain starting position that are in the second configuration information; or
determining, by the terminal device, the quantity N of the resource units and a position of each of the N resource units based on the size of each of the N resource units and the indication information of the frequency domain starting position that are in the second configuration information.

4. An information sending method comprising:
sending, by a network device, configuration information to a terminal device, wherein the configuration information carries precoding indication information of each resource unit of N resource units allocated to the terminal device, N≥1, and N is an integer;
determining, by the network device, a precoding matrix of each of the N resource units, and determining the precoding indication information corresponding to the precoding matrix of each of the N resource units, wherein each piece of precoding indication information indicates the precoding matrix of a corresponding one of the N resource units;
wherein the determining, by the network device, of the precoding matrix of each of the N resource units comprises:
receiving, by the network device, a reference signal from the terminal device;
obtaining, by the network device, a channel matrix of the terminal device on each of the N resource units based on the reference signal through channel estimation; and
traversing, by the network device, at least one precoding matrix in a first codebook set based on the channel matrix on each resource unit, and determining the precoding matrix of each of the N resource units from the at least one precoding matrix based on a capacity maximization criterion; and
wherein the method further comprises:
sending, by the network device, first signaling to the terminal device, wherein the first signaling indicates a second codebook set corresponding to the precoding matrix, and the second codebook set is a subset of the first codebook set.

5. The method according to claim 4, wherein the precoding indication information comprises a transmitted precoding matrix indicator TPMI.

6. The method according to claim 4, wherein the configuration information comprises a first field, and the first field indicates the terminal device to perform precoding processing based on the configuration information when transmitting uplink data.

7. The method according to claim 4, further comprising:
determining, by the network device, the second codebook set based on a quantity of antennas supported by the terminal device and a maximum quantity of transmission layers supported by the terminal device.

8. An information receiving apparatus comprising:
at least one processor; and
a memory storing programming instructions for execution by the at least one processor such that the apparatus is configured to at least to:
receive first configuration information from a network device, wherein the first configuration information carries precoding indication information of each resource unit of N resource units allocated to the apparatus, N≥1, and N is an integer; and
perform precoding processing on uplink data carried on each of the N resource units by a precoding matrix corresponding to the precoding indication information of each of the N resource units, based on the first configuration information;
wherein the apparatus is further configured to:
determine based on the precoding indication information of each of the N resource units and a correspondence between the precoding indication information and a first codebook set, the precoding matrix corresponding to each of the N resource units, wherein the first codebook set comprises at least one precoding matrix; and wherein the apparatus is further configured to:

receive first signaling from the network device, and determine a second codebook set based on the first signaling, wherein the second codebook set is a subset of the first codebook set; and the determination of the precoding matrix corresponding to each of the N resource units comprises:

determining from the second codebook set based on each piece of precoding indication information, the precoding matrix corresponding to each of the N resource units.

9. The apparatus according to claim 8, wherein the precoding indication information comprises a transmitted precoding matrix indicator TPMI; and the performance of the precoding processing on the uplink data carried on each of the N resource units comprises:

performing data mapping by using the precoding matrix corresponding to each TPMI, and determining the uplink data to be transmitted through each antenna port of the apparatus.

10. The apparatus according to claim 8, wherein the apparatus is further configured to:

receive second configuration information from the network device, wherein the second configuration information carries a quantity N of the resource units allocated to the apparatus or a size of each of the N resource units, and indication information indicating a frequency domain starting position of each of the N resource units; and determine a position and the size of each of the N resource units based on the quantity N of the resource units and the indication information of the frequency domain starting position that are in the second configuration information; or determine the quantity N of the resource units and a position of each of the N resource units based on the size of each of the N resource units and the indication information of the frequency domain starting position that are in the second configuration information.

11. An information sending apparatus comprising:

at least one processor; and a memory storing programming instructions for execution by the at least one processor such that the apparatus is configured to at least:

send configuration information to a terminal device, wherein the configuration information carries precoding indication information of each resource unit of N resource units allocated to the terminal device, N≥1, and N is a positive integer, wherein the apparatus is further configured to determine a precoding matrix of each resource unit, and determine the precoding indication information corresponding to the precoding matrix of each of each of the N resource units, wherein each piece of precoding indication information indicates a precoding matrix of one a corresponding one of the N resource units;

wherein in order to determine a precoding matrix of each of the N resource units, the apparatus is further configured to:

receive a reference signal from the terminal device:

obtain a channel matrix of the terminal device on each of the N resource units based on the reference signal through channel estimation; and traverse at least one precoding matrix in a first codebook set based on the channel matrix on each of the N resource units, and determine the precoding matrix of each of the N resource units from the at least one precoding matrix based on a capacity maximization criterion; and wherein the apparatus is further configured to:

send first signaling to the terminal device, wherein the first signaling indicates a second codebook set corresponding to the precoding matrix, and the second codebook set is a subset of the first codebook set.

12. The apparatus according to claim 11, wherein the precoding indication information comprises a transmitted precoding matrix indicator.

13. The apparatus according to claim 11, wherein the configuration information comprises a first field, and the first field indicates the terminal device to perform precoding processing based on the configuration information when transmitting uplink data.

14. The apparatus according to claim 11, wherein the apparatus is further configured to determine the second codebook set based on a quantity of antennas supported by the terminal device and a maximum quantity of transmission layers supported by the terminal device.

* * * * *